United States Patent
Fujioka et al.

(10) Patent No.: US 6,270,402 B1
(45) Date of Patent: Aug. 7, 2001

(54) VIDEO GAME DEVICE, CONTROL METHOD FOR PROCESSING OF SOLICITING VIDEO CHARACTERS TO JOIN SIMULATED TEAM, AND READABLE RECORDING MEDIUM RECORDING CONTROL PROGRAMS FOR PROCESSING OF SOLICITING VIDEO CHARACTERS TO JOIN SIMULATED TEAM

(75) Inventors: Kenji Fujioka, Nishinomiya; Hideto Inoue, Ashiya; Naoki Nishikawa, Kobe; Keiichi Maekawa, Kyoto, all of (JP)

(73) Assignee: Kabushiki Kaisha Konami Computer Entertainment Osaka, Osaka-fu (JP)

( * ) Notice: Subject to any disclaimer, the term of this patent is extended or adjusted under 35 U.S.C. 154(b) by 0 days.

(21) Appl. No.: 09/453,481

(22) Filed: Dec. 9, 1999

(30) Foreign Application Priority Data

Dec. 11, 1998 (JP) .................................... 10-353528

(51) Int. Cl.[7] ........................................ A63F 13/00
(52) U.S. Cl. .................... 463/2; 463/3; 463/4; 463/5; 463/7; 463/43; 463/44
(58) Field of Search ............................. 463/1–8, 43, 44; 273/148 B

(56) References Cited

U.S. PATENT DOCUMENTS

| Re. 35,314 | * | 8/1996 | Logg . |
| 4,504,055 | | 3/1985 | Wells . |
| 4,940,972 | | 7/1990 | Mouchot et al. . |
| 5,267,734 | * | 12/1993 | Stamper et al. . |
| 5,393,071 | * | 2/1995 | Bert . |

(List continued on next page.)

FOREIGN PATENT DOCUMENTS

| 0686944 | 12/1995 | (EP) . |
| 0768105 | 4/1997 | (EP) . |
| 0844010 | 5/1998 | (EP) . |
| 2416510 | 8/1979 | (FR) . |
| 2233197 | 1/1991 | (GB) . |

OTHER PUBLICATIONS

The Magazine "JUGEMU", Edition of Dec. 1997, p. 186, "FAMISTA64" (Dec. 1, 1997, published by Recruit Inc.).

Ron White: "microsoft golf multimedia edition" PC/Computing, vol. 8, No. 8, Aug. 1, 1995 (q995–08–01), p. 176 XP002111041 *the whole document*.

Yamrom B et al: "X, Golf and Object–Oriented Programming" Technology of Object Oriented Languages & Systems Proceedings of the International Conference, Jun. 25, 1990, XP002064538 *figure 1*.

Tim Chown: "Premier Manager 97" Online!, May 1997, pp. 1–9, XP002115838 Retrieved from the Internet: <URL:http://www.gamesdomain.com/gdrview/zones/reviews/pc/may97/pm97.html> retrieved on Sep. 17, 1999!

*Primary Examiner*—Michael O'Neill
(74) *Attorney, Agent, or Firm*—Jordan and Hamburg LLP

(57) ABSTRACT

A ROM is provided, storing a game space having a plurality of places, a main character belonging to a sport team, and a plurality of other characters provided with different capabilities regarding the sport. A wandering processing means causes the main character displayed on a monitor to move to desired places in the game space according to operation of operating keys, executing conversation processing regarding the above solicitation between the displayed main character and other characters, and in the event that the result of the conversation is success in solicitation, the other character is registered to the member registering means. Thus, a game with a high gaming nature and absorbing interest can be provided, wherein the relation between the character of the player and a specific character can be influenced via a main character, and this influence can be reflected on the game story.

32 Claims, 21 Drawing Sheets

U.S. PATENT DOCUMENTS

| | | | |
|---|---|---|---|
| 5,393,072 | * | 2/1995 | Bert . |
| 5,393,073 | * | 2/1995 | Bert . |
| 5,411,259 | * | 5/1995 | Pearsen et al. . |
| 5,435,554 | | 7/1995 | Lipson . |
| 5,636,920 | * | 6/1997 | Shur et al. . |
| 5,885,156 | * | 3/1999 | Toyohara et al. . |

* cited by examiner

VIDEO GAME DEVICE, CONTROL METHOD FOR PROCESSING OF SOLICITING VIDEO CHARACTERS TO JOIN SIMULATED TEAM, AND READABLE RECORDING MEDIUM RECORDING CONTROL PROGRAMS FOR PROCESSING OF SOLICITING VIDEO CHARACTERS TO JOIN SIMULATED TEAM

BACKGROUND OF THE INVENTION

1. Field of the Invention

The present invention relates to a video game apparatus wherein a video character on the video screen is caused to perform a simulation experience (role-playing) instead of the player, a control method, and a readable recording medium storing game programs.

2. Description of the Related Art

Regarding role-playing games wherein a player performs simulated experiences as a video character (hereafter simply referred to as "character") in various scenes on a video screen, growth-type battle games wherein the main character repeats battles with other characters and grows thereby, are known. In the case of such games, the gaming nature is improved by providing each character with different capabilities and personalities.

Also, there are types of role-playing games known wherein multiple characters are displayed on the game screen, and the main character is caused to execute conversation with another character according to instruction from the operating member, or execute a prepared conversation, whereby the game story is expanded to the next setting from the contents of the conversation.

The above battle games are arranged so that the fighting capabilities increase while fighting with opponent characters, but the element of capability grown depends solely on the state of battle with opponent characters, meaning that similar results are always obtained, and tends to lack in absorbing interest.

Also, the latter role-playing games consist of conversation processing between the self character and a certain character, and are not arranged so that conversation processing is executed regarding each of multiple characters. Accordingly, such games cannot be considered to be games of a type wherein conversation with certain characters influences the relation between the self character and certain characters, which is reflected in the game story.

SUMMARY OF THE INVENTION

The present invention has been made in light of the above, and it is an object thereof to provide a video game device yielding a video game wherein the relation between the self character and certain characters is influenced by the main character, and this influence is reflected in the game story, so as to be high in gaming nature and absorbingly interesting; to provide a control method thereof, and a medium storing the game programs thereof.

The video game device according to the present invention comprises: an image storing means for storing a main character belonging to a game space prepared beforehand comprised having a plurality of places and to a sport team, and a plurality of other characters provided with different capabilities regarding the sport; a display means for displaying stored contents; an operating member for instructing the displayed main character to move to various places within the game space; a member registering means for capable of registering other characters as team members, only as many as comprise the team; and a soliciting processing means for at least registering other characters with the member registering means, only as many as comprise the team, by means of operating the operating member to move the main character to certain places.

Also, the control method for processing of soliciting video characters to join simulated team according to the present invention consists of storing beforehand in a manner displayable on display means a main character belonging to a game space prepared beforehand comprised having a plurality of places and to a sport team, and a plurality of other characters provided with different capabilities regarding the sport, operating an operating member to instruct the main character to move to certain places within the game space and registering to the registering means other characters as team members, at least only as many as comprise the team, at the location to which moving was performed.

Also, the readable recording medium according to the present invention records a control program for soliciting video characters to join simulated team, wherein a main character belonging to a game space prepared beforehand comprised having a plurality of places and to a sport team, and a plurality of other characters provided with different capabilities regarding the sport, are stored beforehand in a manner displayable on display means, the operating member is operated to instruct the main character to move to certain places within the game space, and other characters are registered to the registering means as team members, at least only as many as comprise the team, at the location to which moving was performed.

According to the above invention, image data for a main character belonging to a game space prepared beforehand comprised having a plurality of places and to a sport team, and a plurality of other characters provided with different capabilities regarding the sport, etc., is stored in a game cartridge or image storing means such as built-in ROM within the game unit or the like, and when the game is started, the stored contents are displayed as appropriate on a display means which is a monitor such as an LCD, CRT, or the like. The displayed main character moves to desired places within the game space by means of operating the operating member (wandering). Then, other characters are registered by the member registering means at the place to which the main character moved, by means of the soliciting processing means. As for the number to be registered, at least only as many as comprise a team are registered.

DETAILED DESCRIPTION OF THE PREFERRED EMBODIMENTS

Figure 1:
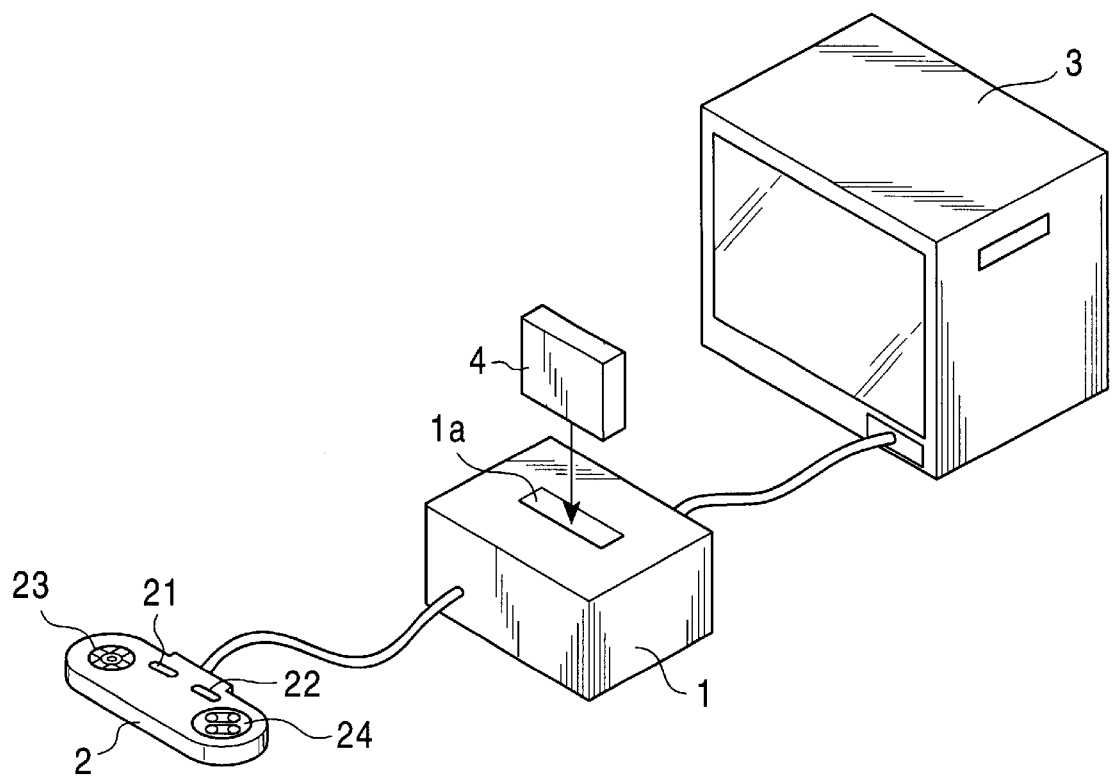
FIG. 1 is an overall perspective view illustrating an embodiment of the video game device according to the present invention.

FIG. 1 is an overall perspective view illustrating an embodiment of the video game device according to the present invention. In FIG. 1, reference numeral 1 denotes a main game unit, 2 denotes a controller connected to the main game unit 1, and 3 denotes a monitor such as a TV or the like which is connected to the main game unit 1 and displays game images. Reference numeral 4 denotes a game cartridge wherein is built in a ROM 41 (See FIG. 2) storing game programs and the like, detachably loaded to a loading portion 1a on the main game unit 1, wherein the inner ROM 41 and the like is electrically connected to the electrical circuits of the main game unit 1 in the state of the game cartridge being loaded. Also, the game cartridge 4 has internal RAM 42 (See FIG. 2), and also has built in a back-up battery B, this back-up battery B enabling certain data to be saved at the internal RAM 42.

The controller 2 functions as an operating member, and has a start key 21 and reset key 22, and further is provided with a cross-shaped key 23 for matching the cursor with various menus displayed on the monitor 3 or instructing movement (up, down, left, right, etc.) (of the character) within the game space provided beforehand, and operating keys 24 for performing action instruction to the character and selection and confirmation of selection menus, configured so as to be connectable to the main game unit 1. The main game unit 1 internally comprises a micro-computer and ROM 101 and RAM 102 (See FIG. 2), and game processing corresponding to commands according to the contents operated by the controller 2 is executed, based on data including the game programs from the ROM 41 of the game cartridge 4 and the image data from the RAM 42.

Figure 2:
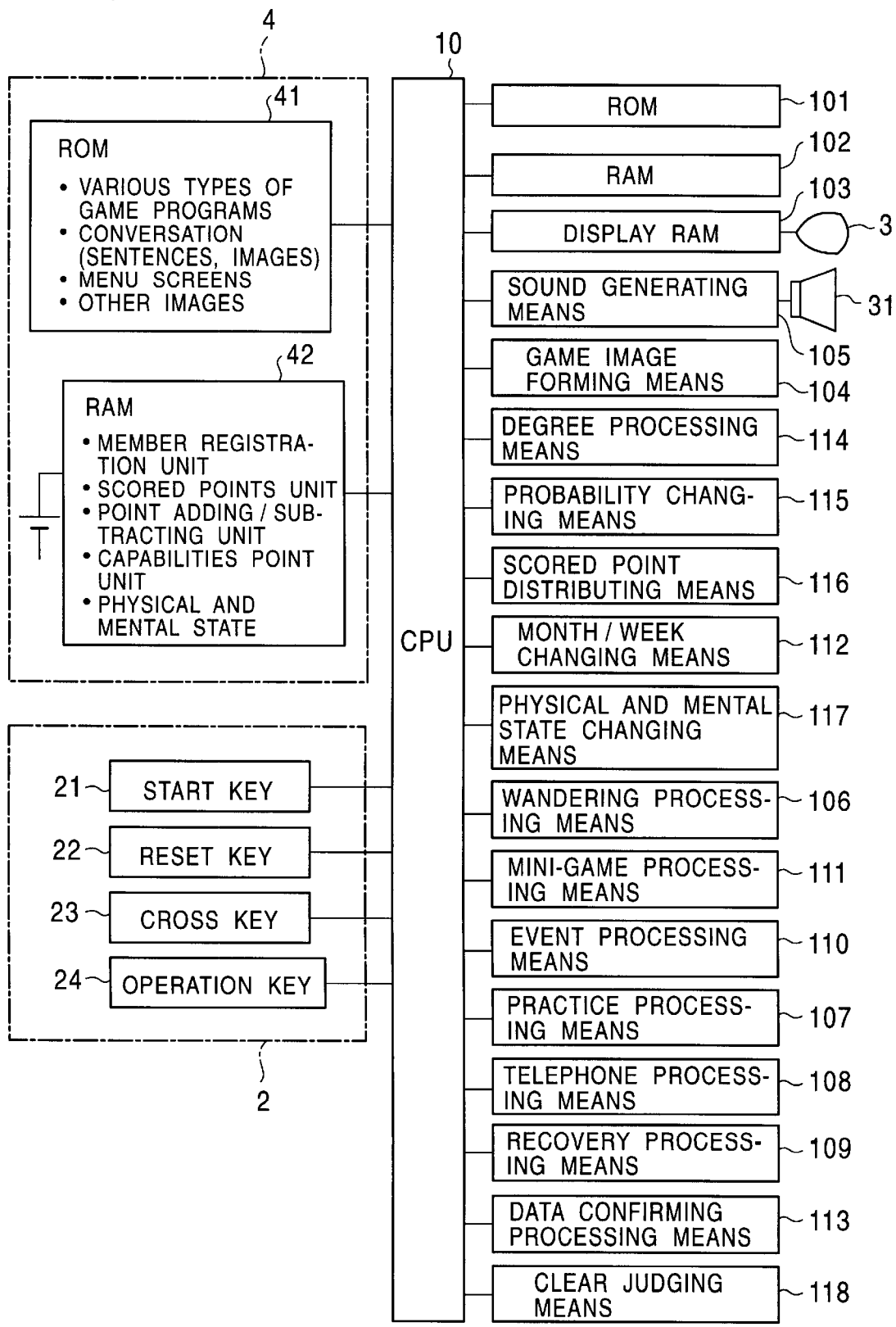
FIG. 2 is a diagram illustrating an example of an internal block diagram of the video game device according to the present invention, with the Central Processing Unit (hereafter referred to as "CPU") of a micro-computer at the center.

FIG. 2 shows an example of an internal block diagram of the video game device according to the present invention, with the Central Processing Unit (hereafter referred to as "CPU") of the micro-computer at the center. This embodiment is an example of a game based on gathering team members for a baseball team at a school set in an imaginary manner. More specifically, the game consists of one member conducting solicitation in order to cause a certain number of students from the same school to join the team as team members (e.g., in the case of a baseball team, at least 9 are necessary), and keeping the baseball team alive by ultimately causing the certain number of members to join, with a time limit on the solicitation in order to further increase the gaming nature. Game programs for executing the game are stored in the ROM 41 of the game cartridge 4, and the arrangement is preferably such that in the event that the above game is achieved (cleared), transition can be made to a game of the next stage (e.g., a game of playing a baseball game).

Also, FIGS. 3 through 15 illustrate an example of the changing of game screens, in order to explain how the solicitation game plays out.

In FIG. 2, the ROM 41 within the game cartridge 4 has a memory map portion wherein are stored game programs, conversation between characters (See FIGS. 5 and 7), images comprising the game space prepared beforehand, images representing the various plates within the game space, one main character, images for other characters (students) of a sufficient number for securing the team members at least, the names of the characters and various basic aptitudes and capabilities (attributes) thereof relating to the sport, and further later-described mini-game programs and game images and the like thereof. The RAM 42 has a memory map portion for updating and storing the contents of: names of members who have joined the team, attributes, later-described scored points and capability points, score addition/subtraction table, physical and mental state (physical shape, morale).

The ROM 101 has therein programs for decoding commands according to the operating contents of the keys 21 through 24 of the controller 2, and for handling basic game screen forming actions, arranged so as to perform basic processing to the monitor 3 and controller 4 regardless of dissimilarity of the game cartridge 4, and the RAM 102 is for temporarily saving processing data which is being processed, and is provided with a memory map portion having a member registration unit for registering data relating to members which have joined the team, and a data storage portion for storing scored points and capability point data, for example. This data is transferred to the RAM 42 at the time of the later-described "save" processing, and is saved.

The display RAM 103 is for one screen to be displayed to be written to, wherein writing and reading is alternately performed at cycles of 1/60 seconds for example, such that a stable image is obtained on the monitor 3 due to the afterimage phenomena. The game image forming means 104 determines the game image in a manner dependent on the operating contents form the controller 2, the game programs in the ROM 41, and the contents of the RAM 42, and forms the displayed image (FIGS. 3 through 16, etc.,) in the above display RAM 103. At the time of starting up the game, in the event that the game cartridge 4 has other games such as a game of the next stage as mentioned above, a menu screen indicating games prepared is displayed as a game selecting screen, and the cross key 23 is operated so that the cursor matches e.g., "team member solicitation" (Figure omitted) which is the present game and the operating key 24 is operated in this state, thereby starting the game.

The sound generating means 105 is for generating audio and effect sounds at the speaker 31. An arrangement may be made wherein the later-described conversation is output as audio along with the display. The audio data is stored in the ROM 41, and is read out by the sound generating means 105 as appropriate according to the scene of the game and emitted from the speaker 31.

The wandering processing means 106 through recovery processing means 109 and data confirming processing means 117 are for executing processes corresponding to the selection menus in the screen shown in FIG. 3 which is the basic screen of the game (the screen to which the flow returns each time the main routine (FIG. 17) ends, as described later)

Figure 3:
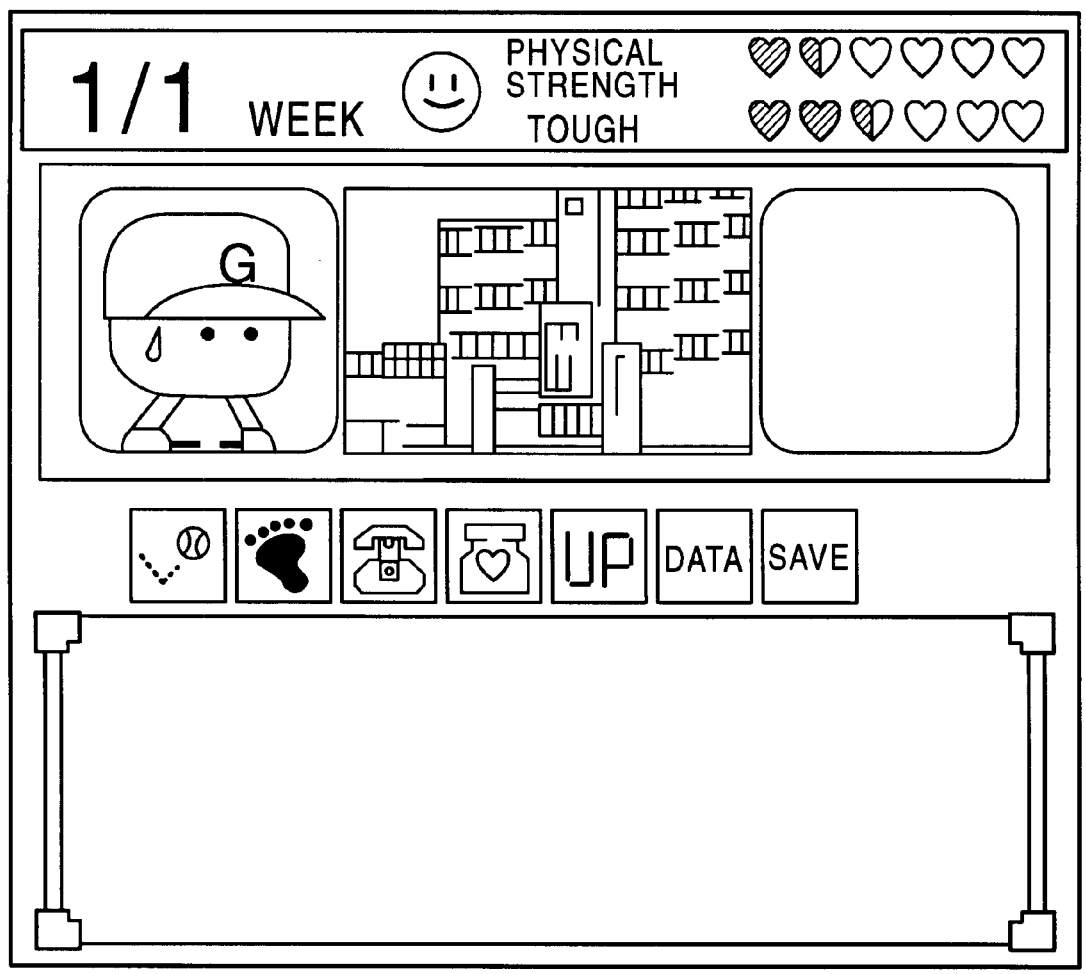
FIG. 3 is a diagram illustrating the basic screen of the present game.
Figure 4:
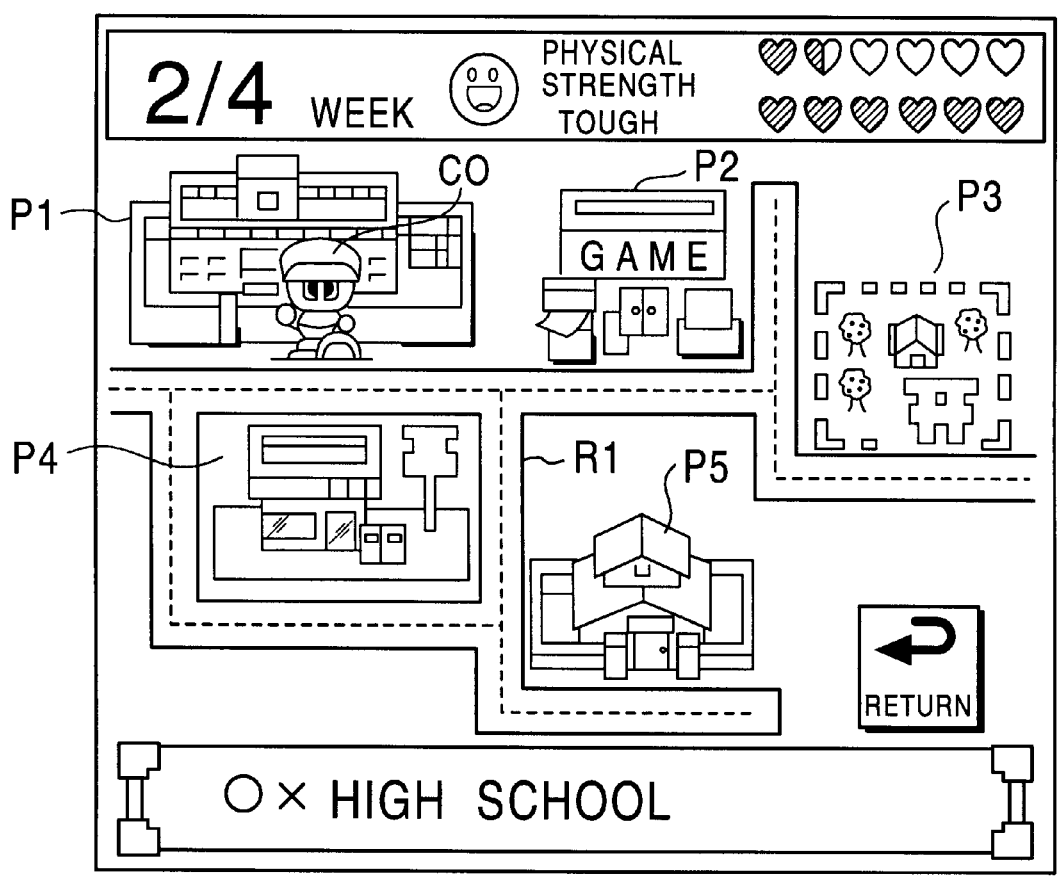
FIG. 4 is a diagram of a screen illustrating an example of a place provided within the game space.
Figure 5:
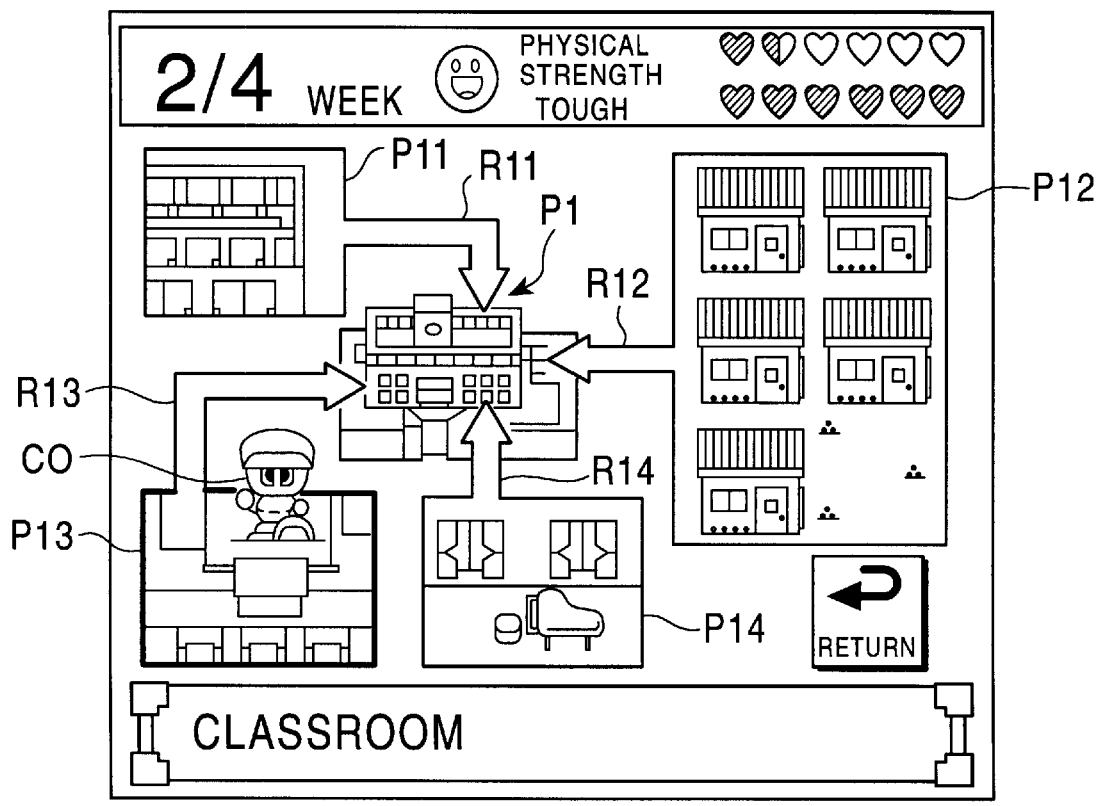
FIG. 5 is a diagram of a screen illustrating a map of the places in the "school"

The wandering processing means 106 is executed by selecting "wandering" from the menu in FIG. 3 (the place where a footprint symbol mark is displayed), and first, a screen indicating the game space in FIG. 4 is displayed and further, in the event that school for example is instructed to the screen in FIG. 4, the screen switches to a screen showing a model of each place in the school such as shown in FIG. 5.

Now, describing the image shown in FIG. 4, C0 is the main character, P1 through P5 are examples of places provided within the game space, with P1 denoting the school, P2 a game arcade, P3 a shrine, P4 a convenience store, and P5 denoting home, with the screens of these places being connected by a road RI. Incidentally, the display "return" at the lower right of the screen is for instructing returning to the previous screen. That last line displays the place which is selected, such as "so-and-so High School", for example.

Then, operating the cross key 23 in the desired direction up, down, left or right, allows the main character C0 to be moved as appropriate to places P1 through P5 and the display "return". FIG. 3 shows the state of having moved to in front of the school gates P1. The place to which the main character C0 has moved has a form so as to facilitate differentiation from other places, such as relatively increasing the intensity of the display color, blinking, etc., so as to change the display state (to act as a cursor state) as compared with others. The selected place is confirmed by operating the operating keys 24 (more specifically, the "A button" which is a certain key within the operating keys 24) in the state of the main character C0 being moved to the desired place.

Also, describing the screen for "school" shown in FIG. 5, P11 is the roof of the school building, P12 denotes multiple rooms, P13 is the classroom, and P14 is the music room, with the images of the places P11 through P14 being connected with the image of the school P1 at the center with passages R11 through R14. Selection of the places P11 through P14 is made by moving the main character C0 by operating the cross key 23. In FIG. 5, the main character C0 has moved to the classroom P13. Operating the operating keys 24 confirms the movement to the selected place.

The setting is such at there are students (other characters) provided beforehand with names and aptitude and capabilities data (attributes) regarding baseball or sports in general as necessary, basically with different capabilities provided to each individual, located at at least several or all of the places P11 through P14, so that conversation (exchange) processing for soliciting other characters to the team is performed in accordance with confirmation of movement of the main character C0 to that place. It is preferable that other characters be at at least all places, but distributing and situating as appropriate with the number making up the team is sufficient, and two or more other characters may be located at one place as necessary. For example, brothers who act together may be entered so that both can be solicited at once. Also, the other characters are not only at the school P1, but appropriately situated at the other places P2 through P5 shown in FIG. 4, as appropriate.

Describing the basic screen shown in FIG. 3, at the top of the screen there are displayed the month, week, a face mark indicating the physical and mental state, and a plurality of heart marks which are filled in to an amount representing the degree of "physical strength" and "tough", respectively, having an image of the main character C0 to the lower left side thereof and a display frame which can display another character C1 which is met (i.e., regarding which solicitation is to be attempted) to the right, and an image representing in front of the school gates of the school P1 is displayed in the center. At the generally center portion, the various menus are selectably displayed, and the bottom portion displays the contents of conversation and other guide characters. The menus from the left are: "practice" (represented with a symbol mark of a ball), "wandering" (represented with a symbol mark of a footprint), "telephone" (represented with a symbol mark of a telephone), "recovery" (symbol mark of an energizing drink), "increase capabilities" (the characters "UP"), "confirm data" (the characters "DATA"), and "save data" (the characters "SAVE"). Incidentally, FIG. 3 is a screen immediately after starting the game, since the month and week is the first week of January.

Figure 6:
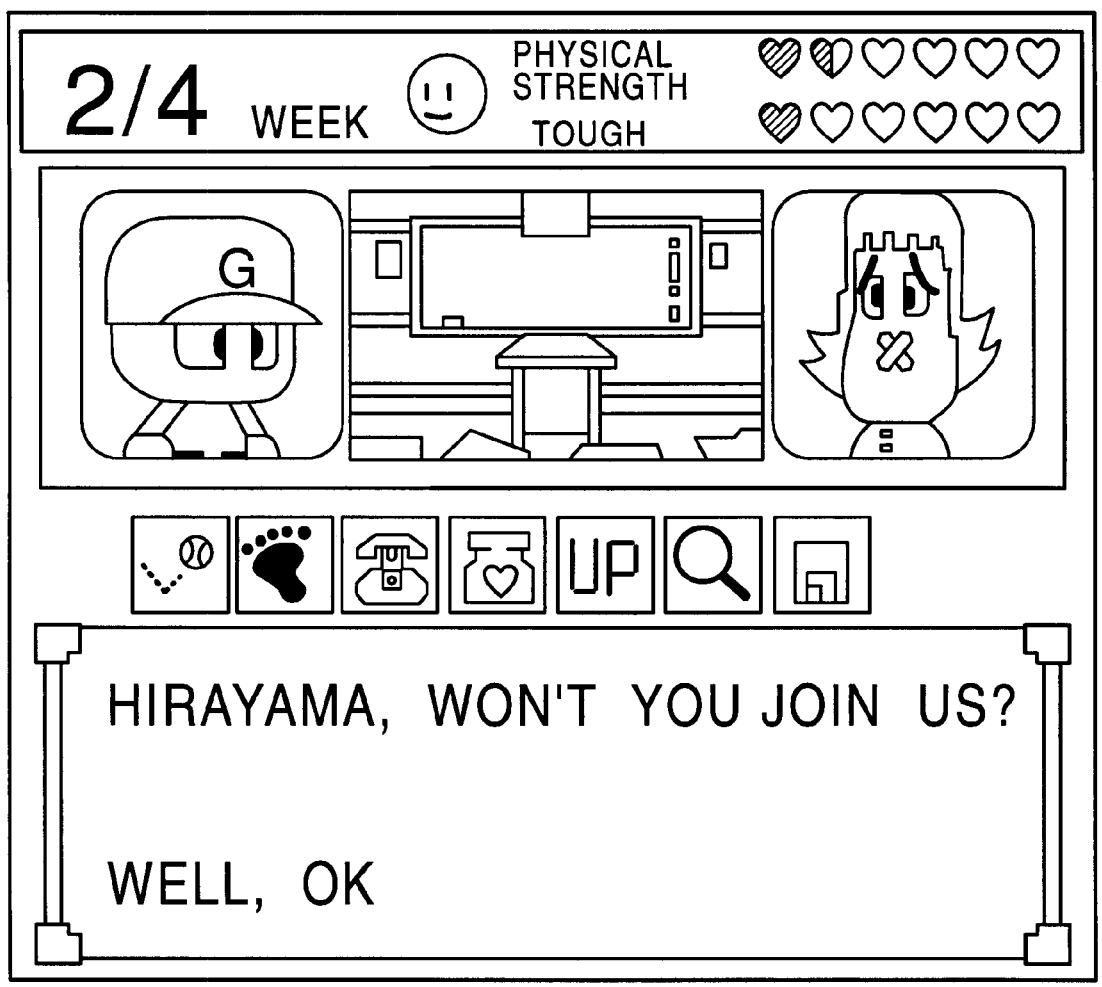
FIG. 6 is a diagram illustrating an example of a soliciting screen.

The wandering processing means 106 also functions as solicitation processing means, and in the event that there are other characters at the place to which the main character C0 has moved, processing is performed so that the other character C1 is automatically met upon confirmation of moving, and conversation processing is automatically executed with the other character C1 as shown in the soliciting screen in FIG. 6.

In FIG. 6, the main character C0 is to the left side of the screen, and the face image of the other character C1 is displayed to the right side. The classroom P13 is displayed between the two, indicating that the main character met another character at the classroom P13. The conversation contents are displayed at the lower part. In this example, this shows that a conversation with "Hirayama Ichiro" serving as the other character C1 has been made indicating soliciting and the intent to join the team, such as, "Hirayama, won't you join us?" "Well, OK".

Figure 7:
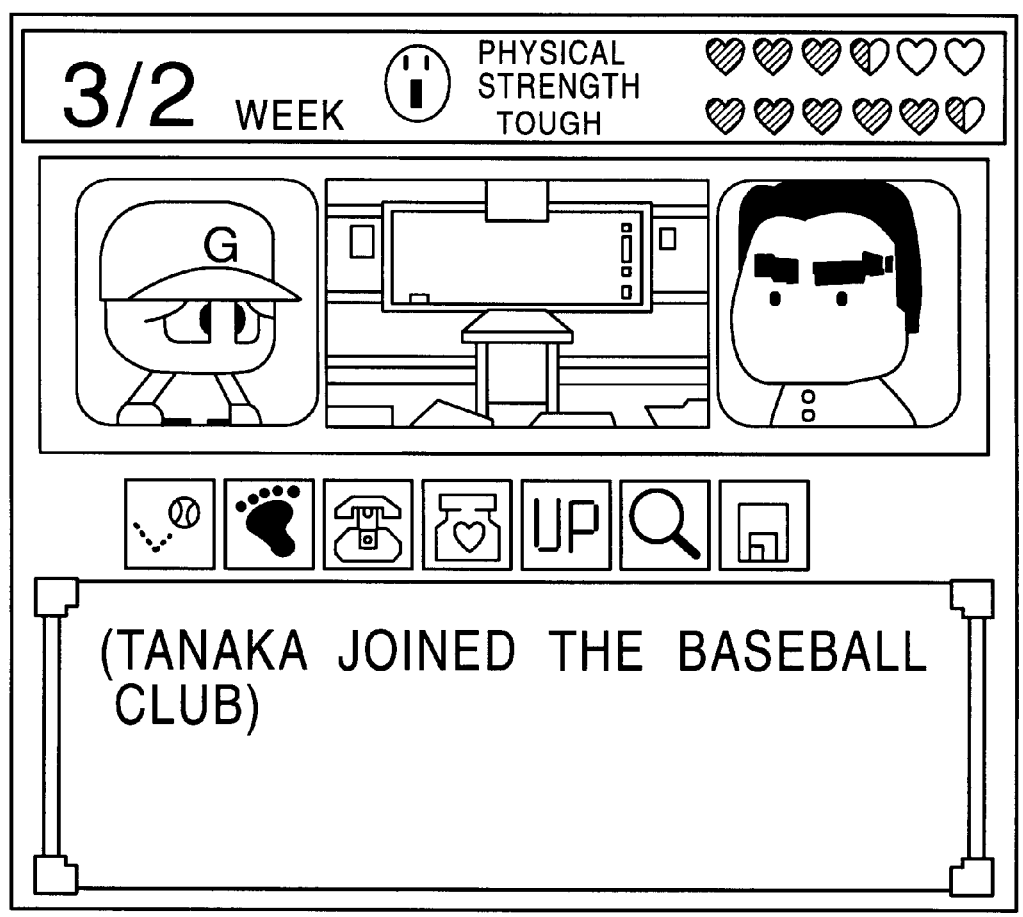
FIG. 7 is a diagram illustrating an example of an automatic joining screen, as one event.

Also, the joining processing has automatic joining processing as once of the later-described randomly-occurring events related or unrelated with the "wandering", besides the form of the main character C0 going to a certain place (moving) and solicit joining as shown in FIG. 6, and as shown in FIG. 7, a scene where another character C1 called "Tanaka", whose face is shown to the right of the screen, automatically elects to join. Then, the students regarding which solicitation has succeeded (FIG. 6) or automatically joined (FIG. 7) are registered in the member registering unit within the RAM 102 along with the aptitude and capabilities (attributes) thereof as a team member. In FIG. 7, the place is the classroom P13, but with automatic joining processing, the place does not have to be restricted in particular, so this may be in front of the school gates (see FIG. 3), and basically may be any of the places P1 through P4 and P11 through P14.

Figure 8:
FIG. 8 is a diagram illustrating an example of a soliciting screen with a mini-game as a condition.
Figure 9:
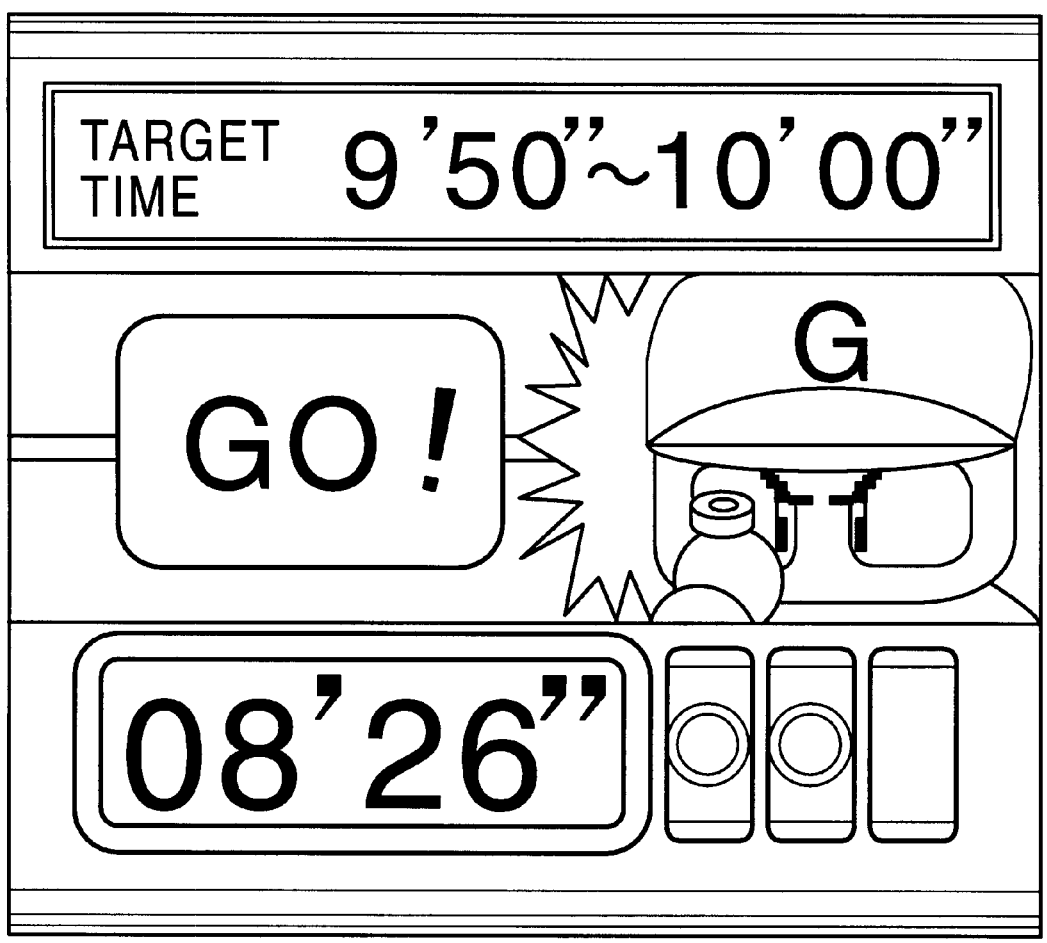
FIG. 9 is a diagram illustrating an example screen of a mini-game.

Also, the wandering processing means 106 is configured so as to execute soliciting forms such as shown in FIGS. 8 and 9, in comparison with the soliciting form shown in FIG. 6. That is, the soliciting forms shown in FIGS. 8 and 9 have prepared certain mini-games to be played by the player himself/herself as a condition for joining, so that in the event that the player attempts the mini-game and the results clear certain conditions, this constitutes success in soliciting. Then, in the event that the solicitation has succeeded, the student is registered in the member registering unit along with points relating to the aptitude and capabilities (attributes) thereof as a team member.

That is, students who are to be solicited have various capabilities including basic aptitude, and the setting is made such that students with low or average capabilities can be basically solicited by going to the place where that student is located or by an event occurring, but conversely, five students for example already belonging to other athletic teams or having high capabilities are prepared in the case of a baseball team as with the present embodiment, and situated in the music room P14 or the like as students with special abilities. Then, the setting is such that in the event that movement is made to the locker room P12 of athletic teams or the like, the player is caused to play a mini-game, thereby creating a difference in the difficulty of soliciting. Thus, it is easy to get students with low or average capabilities to join the team, but this creates a weak baseball team, and on the other hand, making it difficult to get students with high capabilities to join the team provides a hurdle with a gaming nature in the process of creating a strong baseball team, making for a game with absorbing interest.

An example of a mini-game will be described with reference to FIGS. 8 and 9. In the event that the main character C0 moves to the field and track team, which is one of the athletic team locker rooms P12, the screen switches to that shown in FIG. 8.

In FIG. 8, a track is shown in the center of the upper half, the other character C1 regarding which solicitation is desired is displayed to the right side thereof, and a conversation for starting the mini-game, "Here we go! Are you ready? Start set No. 1!", is displayed at the lower half, following which the screen in FIG. 9 is displayed.

FIG. 9 shows a time measuring game, and the sign "GO!" for starting the game is displayed, and also this indicates the state immediately after the player has predicted elapsing of 10 seconds following starting and has operated the operating keys 24. The player must attempt this time measuring game three times and clear the certain conditions all three times, and the circles in the two frames to the left of the three frames shown at the lower left side of FIG. 9 show that the certain conditions have been cleared the first time and the second time. The certain conditions consist of, for example, the time elapsing from the start to the pressing of the operating keys 24 being between 9 seconds 50 to 10 seconds flat, as compared with a target time of 10 seconds. The third trial in FIG. 9 shows a failure at 8 seconds 26. This means a failure in the attempt to solicit the other character shown in FIG. 8. Incidentally, the conditions for joining the team may be clearing two out of three trials, or the difficulty of the game may be made to be selectable, with the conditions for clearing being further narrowed, or relaxed. Other examples of mini-games for the player to play may include an agility trial game of how many times the play can successively hit the operating keys 24 within a certain amount of time, or a reflex game wherein direction indicating marks are successively displayed on the screen in a guiding manner regarding which the player accurately presses the cross key 23 in a manner corresponding to these marks; what is important is that the player is made to perform key operations, and the operating capabilities of the player are reflected in the game.

Figure 10:
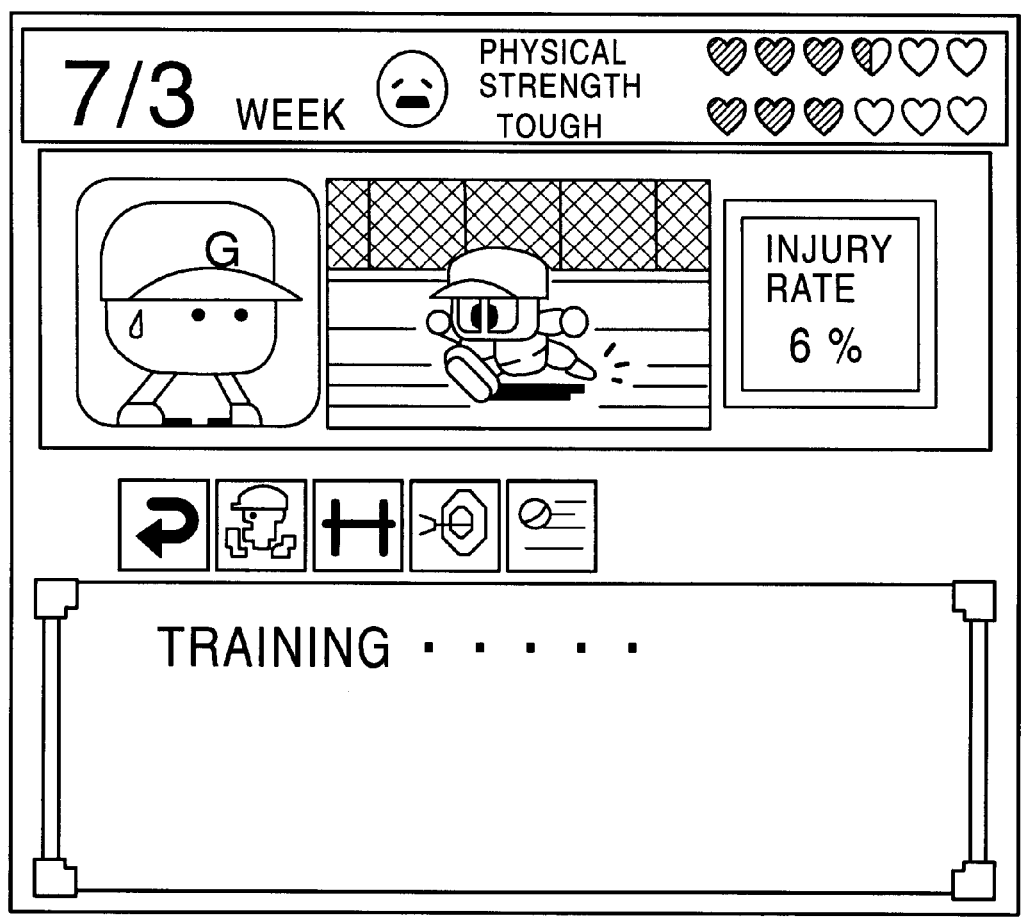
FIG. 10 is a diagram illustrating an example of the "practice" screen.
Figure 11:
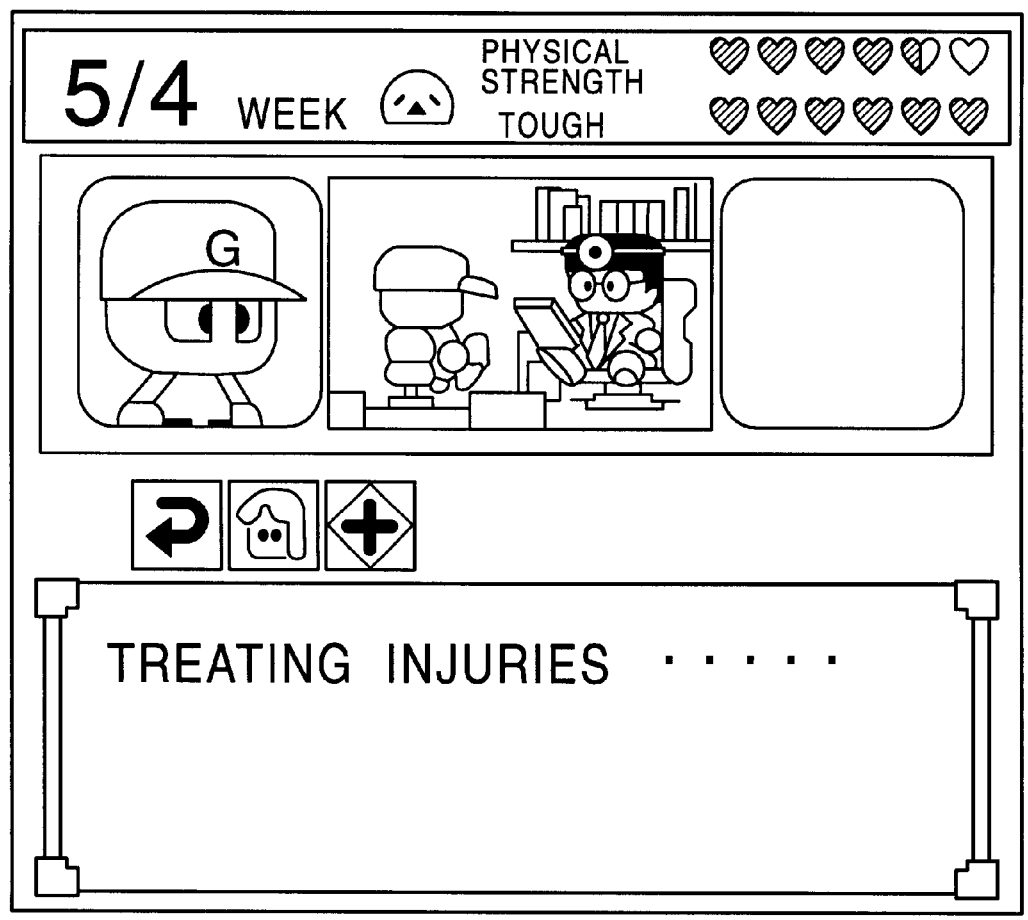
FIG. 11 is a diagram illustrating an example of a screen indicating treatment.

The practice processing means 107 is executed in the event that the "Practice" menu in FIG. 3 is specified, so as to display the screens such as shown in FIG. 10 for a certain amount of time, and performs a guide display indicating the contents of practice at the lower half such as "practicing . . . " or the like, along with showing a screen of the member running, at the top. Incidentally, the menu at the center consists of "return", "running", "weight training" and so forth from the left, the various practice menus displayed so as to be instructable by the cross key 23 for position instructing and the operating keys 24 for confirming. Also, the degree of "physical strength" and "tough" (determined by the amount of heart marks filled in) is sued to calculate the "injury rate", and is displayed in a manner such as "6%", as shown in FIG. 10. Also, "injury" occurs at a ratio according to the "injury rate", and a screen (Figure omitted) indicating "injury occurrence" is displayed. FIG. 11 is a screen indicating treatment following the "injury occurrence" screen, and makes a guide display of characters at the lower half such as "treating injuries . . . " or the like. The level of "physical strength" and "tough" increases or decreases according to the "practice" and "injury".

Figure 12:
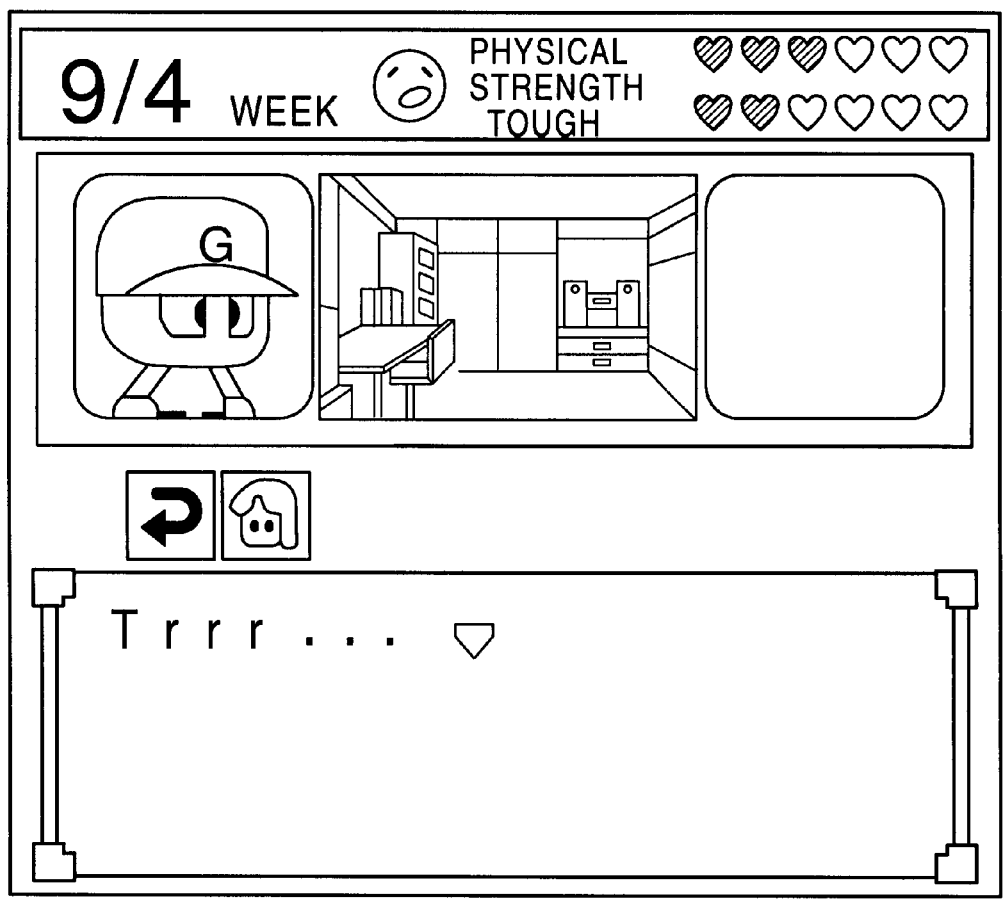
FIG. 12 is a diagram illustrating an example of the "telephone" screen.

The telephone processing means 108 starts processing by the "telephone" menu shown in FIG. 3 being selected, and as shown in FIG. 12, consists of calling a friend or the like from home P5, for example. The call tone "Trrr . . . " of the telephone is displayed at the lower half of the screen, and following this screen, the contents of the conversation are displayed at the lower half, though not shown in the Figures, either randomly from various contents prepared beforehand or selected according to the state of progression of the game. Due to this telephone call, the level of "physical strength" and "tough" basically increases, but no practice is performed, so the capabilities value decreases.

Figure 13:
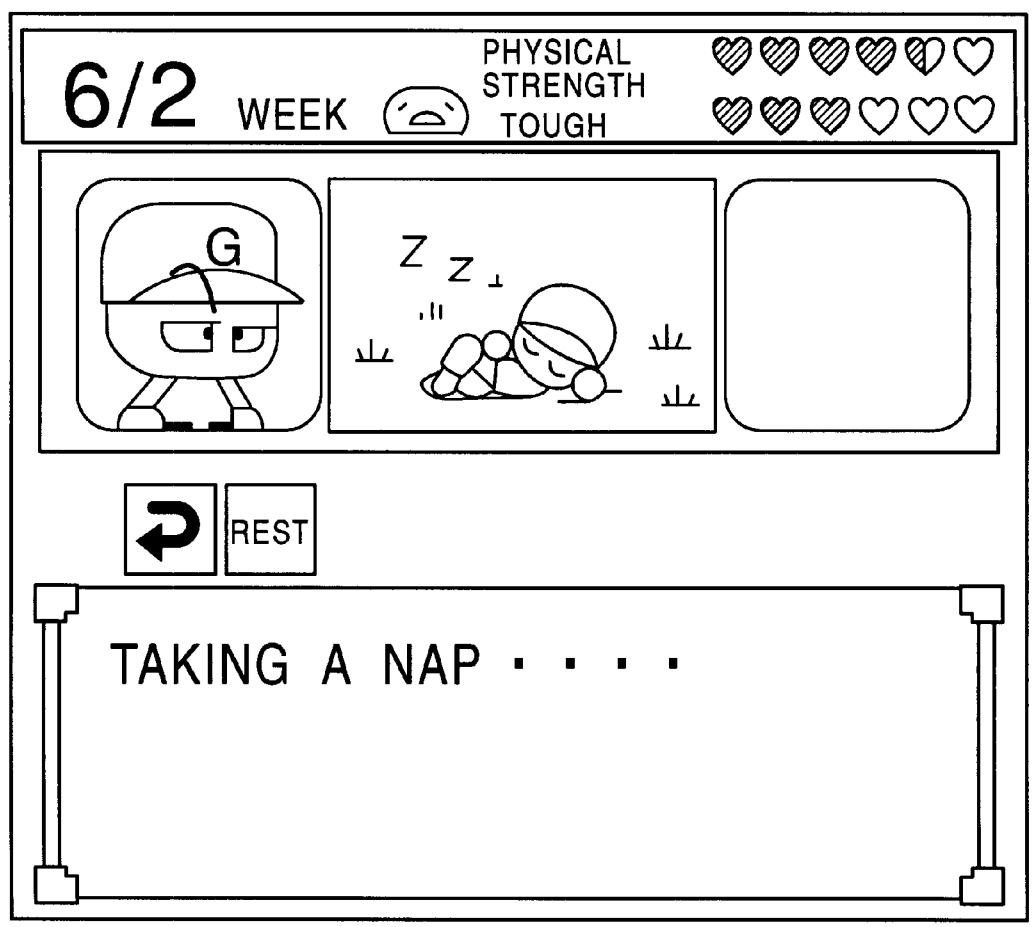
FIG. 13 is a diagram illustrating an example of the "recovery" screen.

The recovery processing means 109 performs processing by the "recovery" menu shown in FIG. 3 being selected. In the event that the "physical strength" and "tough" levels decrease, the "injury ratio" increases, so appropriately selecting "recovery" subdues the occurrence of injuries. As shown in FIG. 13, a screen indicating rest which is a form of "recovery" is displayed in the screen, and also a guide display of characters such as "napping . . . ", indicating rest, is made. consequently, recovery of "physical strength" can be made, but no practice is performed, so the capabilities value decreases.

Each time that the wandering processing means 106 through recovery processing means 109 are executed, the data in the date display frame shown at the upper left in each screen shown in FIG. 3 through FIG. 13, i.e., the contents of the month and week, change.

That is, the month/week changing means 112 is arranged so that one week passes each time "practice", "wandering", "telephone", "recovery" shown in FIG. 3 are selected, or each time "treatment" (FIG. 11) occurs, or each time an "event" shown in FIGS. 7 and 8 (FIG. 9) occurs, so as to change the month and week display in the time defined within the game space. This month/week changing means 112 is arranged so as to start the game at the first week of January, and end on the fourth week of December. The CPU 10 performs time limit management with 12 months as the game period, and the clear judging means 118 judges whether or not at least eight other characters C1 have joined at the tome that the 12 months have ended to create a baseball team from at least nine members, i.e., whether or not the baseball team has been kept alive.

Figure 14:
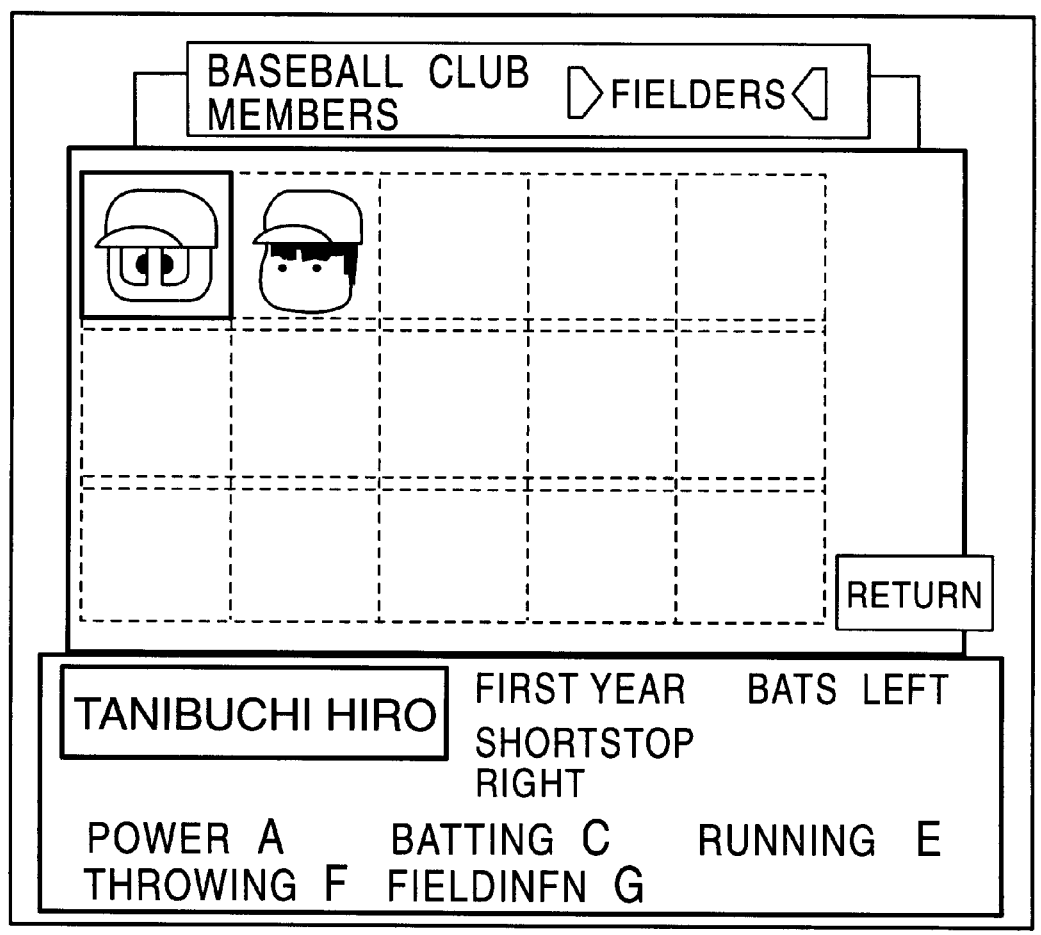
FIG. 14 is a diagram illustrating the screen displaying a list of players who have joined (fielders)
Figure 15:
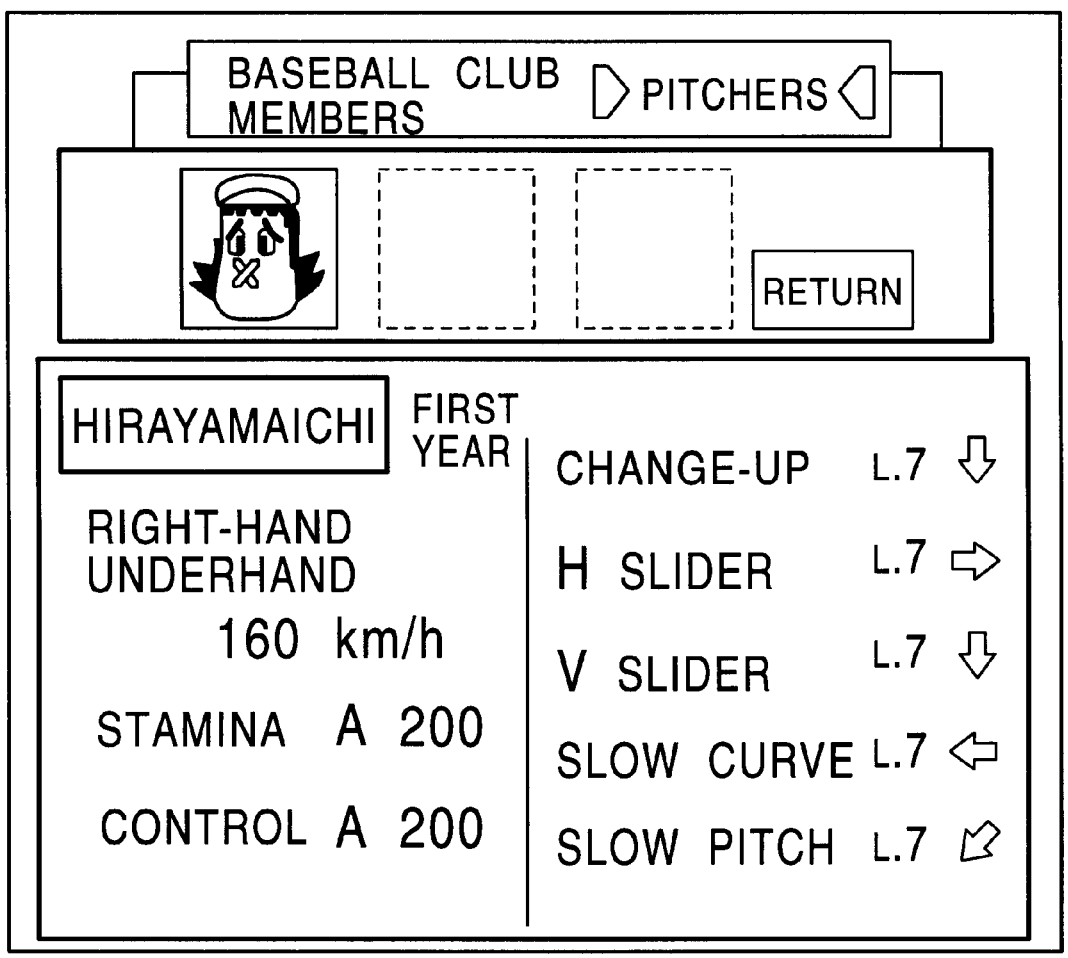
FIG. 15 is a diagram illustrating the screen displaying a list of players who have joined (pitchers)
Figure 16:
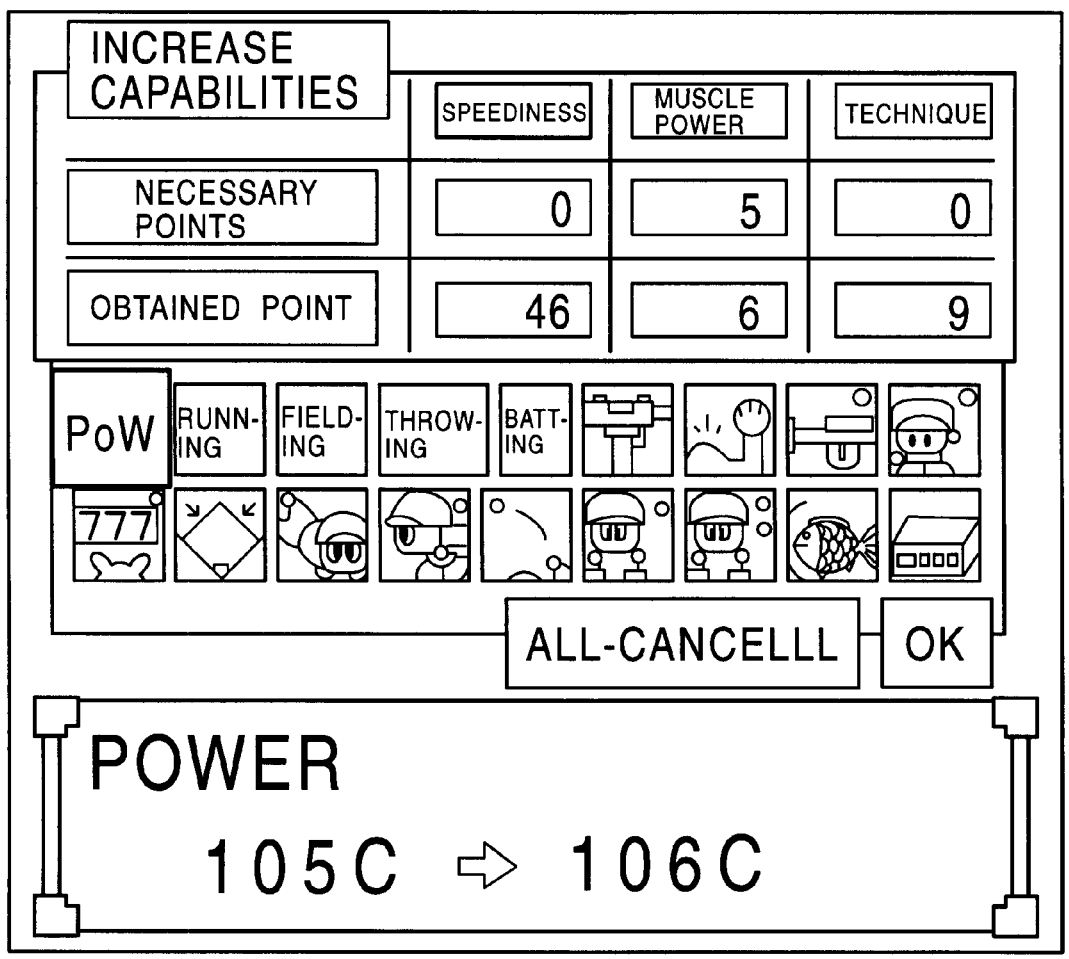
FIG. 16 is a diagram illustrating a screen for distributing the "obtained points" to "capability points"

The data confirming processing means 113 performs processing by the "data" menu shown in FIG. 3 being selected, and the face images of the fielders which have joined the team (maximum of 15) and the face images of the pitchers which have joined the team (maximum of 3) are each displayed as a list, as shown in FIGS. 14 and 15. Incidentally, whether joining students are registered as fielders or registered as pitchers is preset in the attributes information for each student. Then, as shown in FIG. 14, at the bottom of the list is the attributes and various capabilities of "Tanibuchi Hiroshi" which is the main character C0, in symbols A, B, C, . . . G. Also, as shown in FIG. 15, the attributes and capabilities as a pitcher of "Hirayama Ichiro" who is a pitcher at the bottom of the list, are displayed. Particularly, the right half represents the force of each type of pitch in terms of L (level) 1 through 10.

The degree processing means 114 is used for adding scored points appropriated regarding "speediness", "muscle power", and "technique" to the currently obtained points, by selecting "practice" shown in FIG. 10 and undergoing various types of practice, or for reducing the certain values for each according to negative events.

Incidentally, at first, addition or subtraction is performed to points representing capabilities such as basic aptitude or the like, and the currently-obtained points continuously change according to practice and the like, thereby causing the obtained points for each member reflecting the base (initial value: basic points), and processing is performed such that students with higher basic points also have higher obtained points in accordance with the base. Also, the various menus shown in FIG. 3 are instructions to the main character C0, but the degree processing means 114 performs the adding or subtracting processing of the scored points for each of the members, as if all members who have joined are simultaneously performing the same menu. However, the values added or subtracted are set according to the current state of each member, so consequently, the setting is such that the same values are not necessarily added or subtracted to or from all members. However, overall, there is the advantage that the directionality of the team can be matched, thus facilitating ease of creating a goal team.

The probability changing means 115 is for randomly setting the probability for performing the above adding or subtracting action, and for taking using the state of "month/week", accumulated practice, history of events, etc., as change factors, regarding the type of practice, or various events, taking these factors into consideration to set the probability. For example, in the event that each of the factors are in a good direction or results, action is taken to raise the probability, and in reverse cases, action is taken to lower the probability (in the case of adding points).

The scored point distributing means 116 is for executing computation at the time of appropriating "scored points" to the various types of "capability points" relating to the baseball sport. Appropriating the "scored points" to the "capability points" will be described with reference to FIG. 16. With FIG. 16, the type of obtained point is displayed at the topmost position, the currently-obtained points are displayed on the third line, and an image representing the various "capabilities" for allocating is displayed at the center, and the results of this distribution is displayed at the lower portion. To specifically describe the example in FIG. 16, the scored points are "speediness: 46 points", "muscle power: 11 points" (however, as described later, 5 points have been used in order to raise the capability "Pow" (power) by 1 point, so the display shows 6 points), and "technique: 9 points". Now, "Pow" is selected as the object of allocation, and the "scored point" necessary to raise the "capability" by 1 point is displayed in the second line as "speediness: 0 points", "muscle power: 5 points", and "technique: 0 points". As a result, the power capability is increased by 1 point (appropriated) as indicated by "Power 150C to 106C" at the bottom space.

Also, the physical and mental state changing means 117 causes the degree of "physical strength" and "tough" shown at the upper right in FIGS. 3 through 8 and FIGS. 10 through 13 represented in the amount of heart marks filled in, and also changes the display of the expression of the face mark at the center.

Next, the action procedures of the soliciting game will be described with reference to FIGS. 17 through 22.

Figure 17:
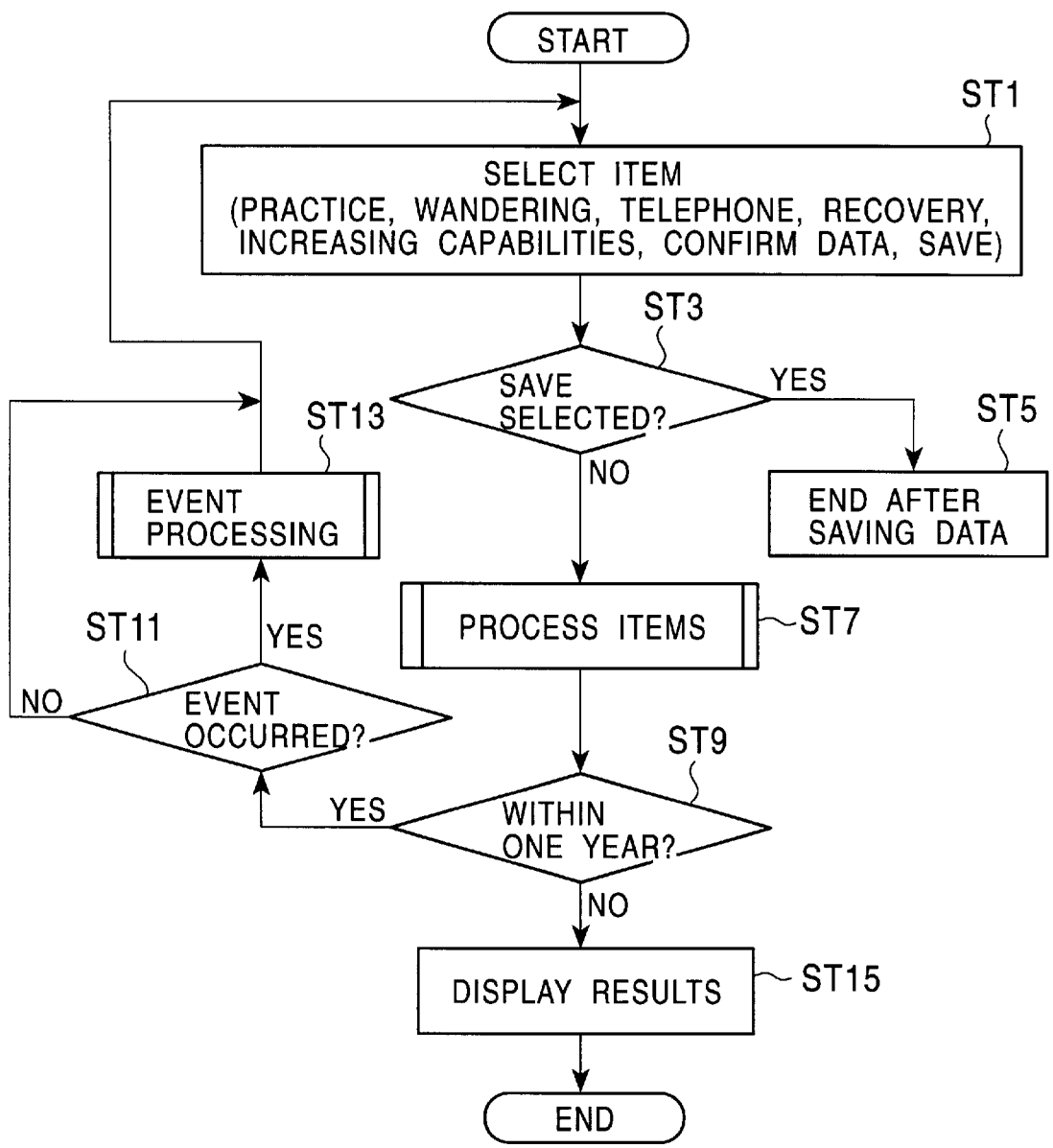
FIG. 17 is a diagram illustrating a flowchart illustrating the main routine.

FIG. 17 is a flowchart illustrating a main routine, and at the time that the soliciting game starts, first, the basic screen shown in FIG. 3 is displayed, and menu selection "Item selection" is performed (step ST1) at this screen using the cross key 23 and operating keys 24. At this time, in the event that "save" is selected (Yes at step ST2), the results partway through the game (or at the end of the game) are saved in the RAM 42 (step ST3), so that the game can be continued at the next time. Accordingly, the data generated by normal processing is basically stored in the RAM 102 of the main game unit 1. In the event that a menu other than "save" is selected, the selected menu is executed by the corresponding processing means (step ST4), and when the processing ends, judgement is made whether or not the period of one year has ended (whether or not the fourth week of December has passed) (step ST5). In the case that one year has elapsed, "Game over" is displayed in the event that the game has not been cleared, and a display is made to the effect that the game has been cleared in the event that the number of registered members has attained the certain number (step ST8), and the game ends.

On the other hand, in the event that the time is within one year, judgement is made whether or not an automatic joining event such as shown in FIG. 7 for example has occurred (step ST6), and in the event that as randomly-determined event has not occurred, the flow returns to step ST1, i.e., the basic screen, and in the event that an event has occurred, the event processing is executed (step ST7) following which the flow returns to step ST1.

Figure 18:
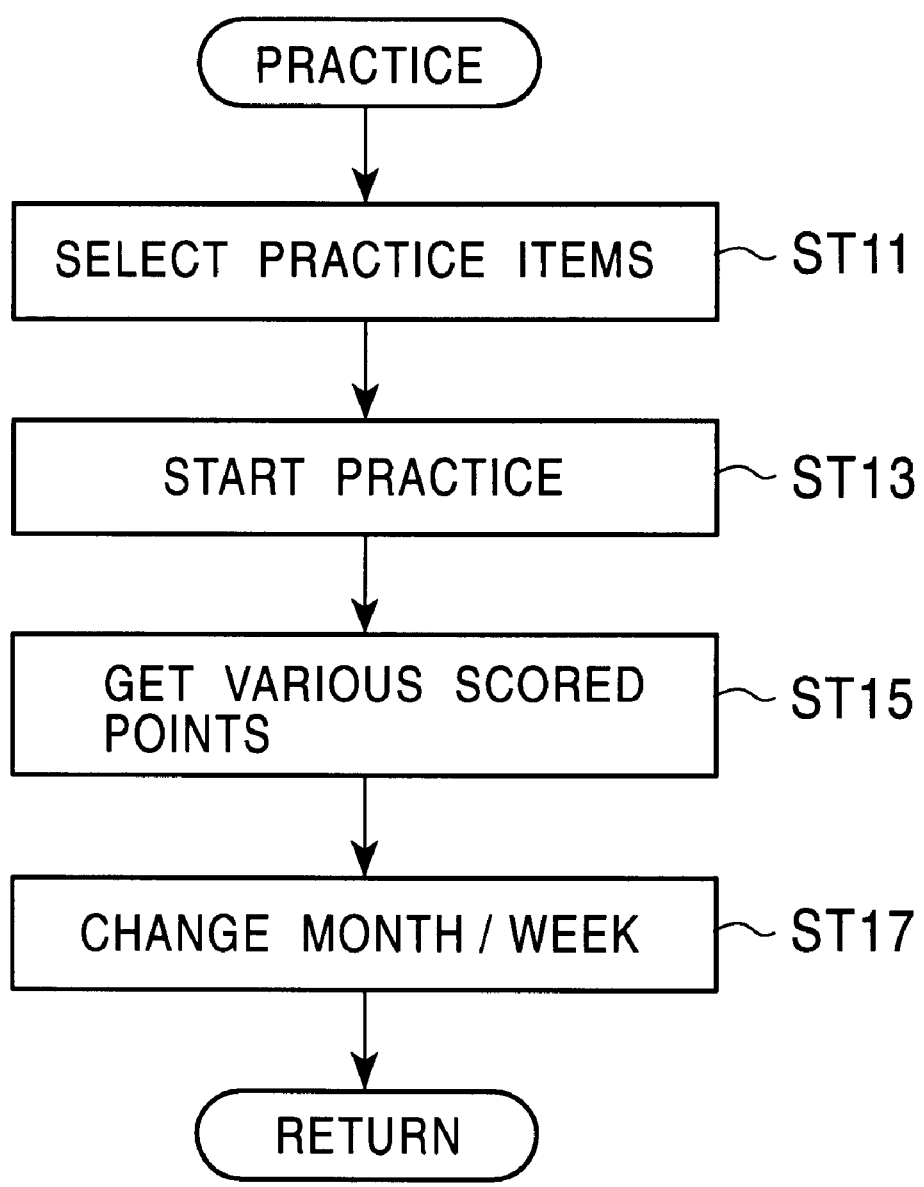
FIG. 18 is a diagram illustrating the sub-routine of the "practice" menu in step ST4.

FIG. 18 shows a sub-routine of the "practice" menu in step ST4. In the event that a screen showing a practice menu such as shown in FIG. 10 is displayed, selecting a certain menu therefrom (step ST11) causes the processing of the selected menu to be executed by the practice processing means 107 (step ST13), and scored points are obtained by the degree means 114 and the like (step ST15). Next, the month/week changing means 112 advances the month and week by one week (step ST17), thus completing the present flow.

Figure 19:
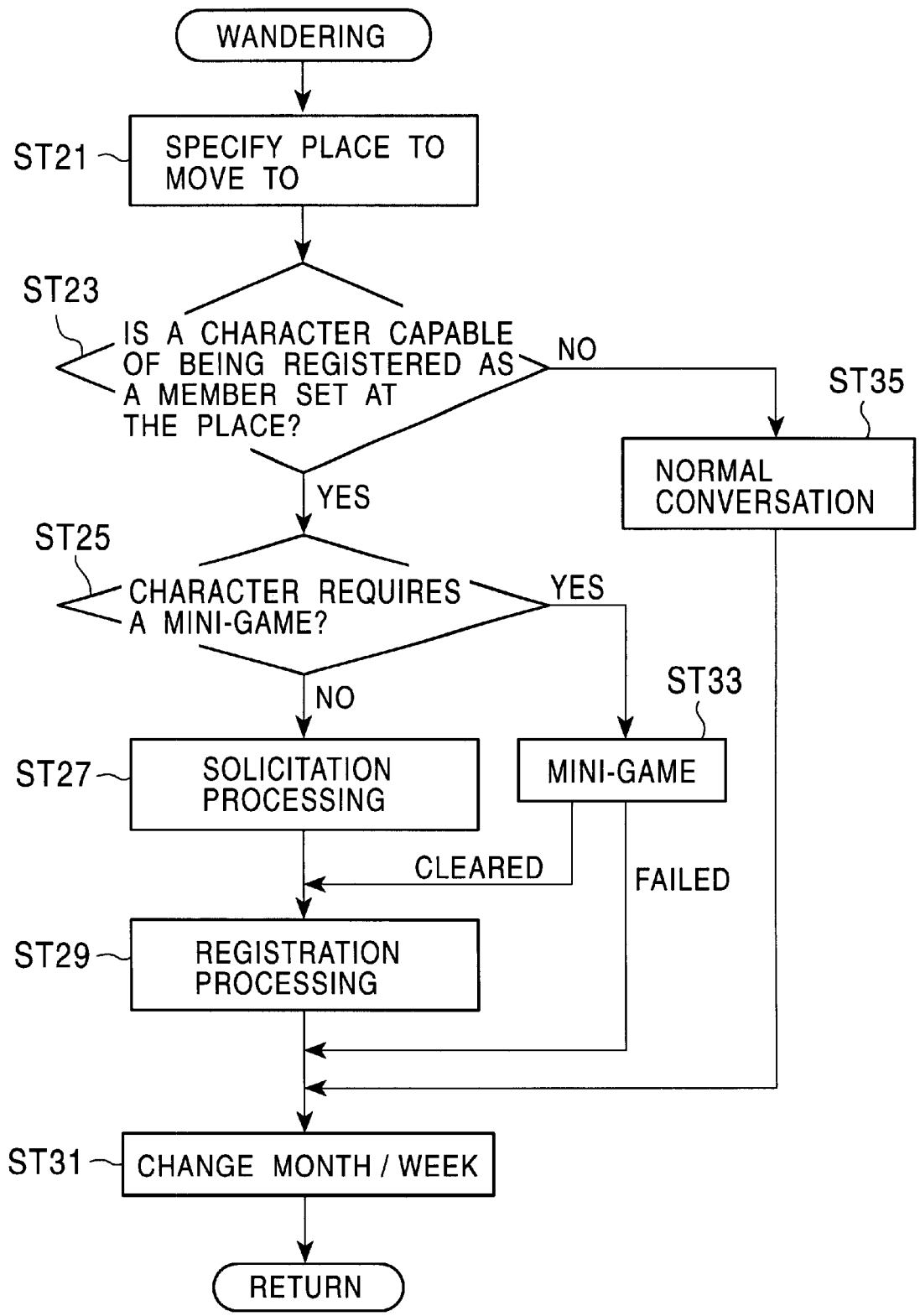
FIG. 19 is a diagram illustrating the sub-routine of the "wandering" menu in step ST4.

FIG. 19 shows a sub-routine of the "wandering" menu in step ST4. In the event that the "wandering" menu is selected from the screen shown in FIG. 3, the screen shown in FIG. 4 is displayed by the wandering processing means 106, and moving to a certain location can be instructed to the main character C0 (step ST21). Then, judgement is made whether or not other characters capable of being registered as members are set at the instructed place (step ST23), and in the event that such are set, judgement is made whether or not that the other character is a character which requires a mini-game (step ST25). In the event that the other character is not a character which requires a mini-game, the soliciting process shown in FIG. 6 is executed (step ST27), and registration processing to the member registration unit of the RAM 102 is executed (step ST29), following which the month and week is advanced by one week (step ST31), thus completing the present flow.

On the other hand, in the event that the other character is a character which requires a mini-game, the event processing shown in FIGS. 8 and 9, i.e., the mini-game is executed (Step ST35), and in the event that the certain conditions have been cleared (step ST33), registration processing to the member registration unit is executed (step ST29), and the flow proceeds to step ST31, and in the event that the mini-game is not cleared (failed), the flow proceeds to step ST31 as is, and the present flow ends.

Also, in step ST23, in the event that another character capable of being registered as a member is set at the instructed place, but judgement is made that another character capable of being registered as a member is not set at the instructed place, including cases of this character having already been registered as a member, a separate character which cannot be registered as a member (e.g., the vice-principal) appears, a normal conversation process which does not constitute solicitation is executed (Step ST35), following which the flow passes through step ST31 and ends.

Figure 20:
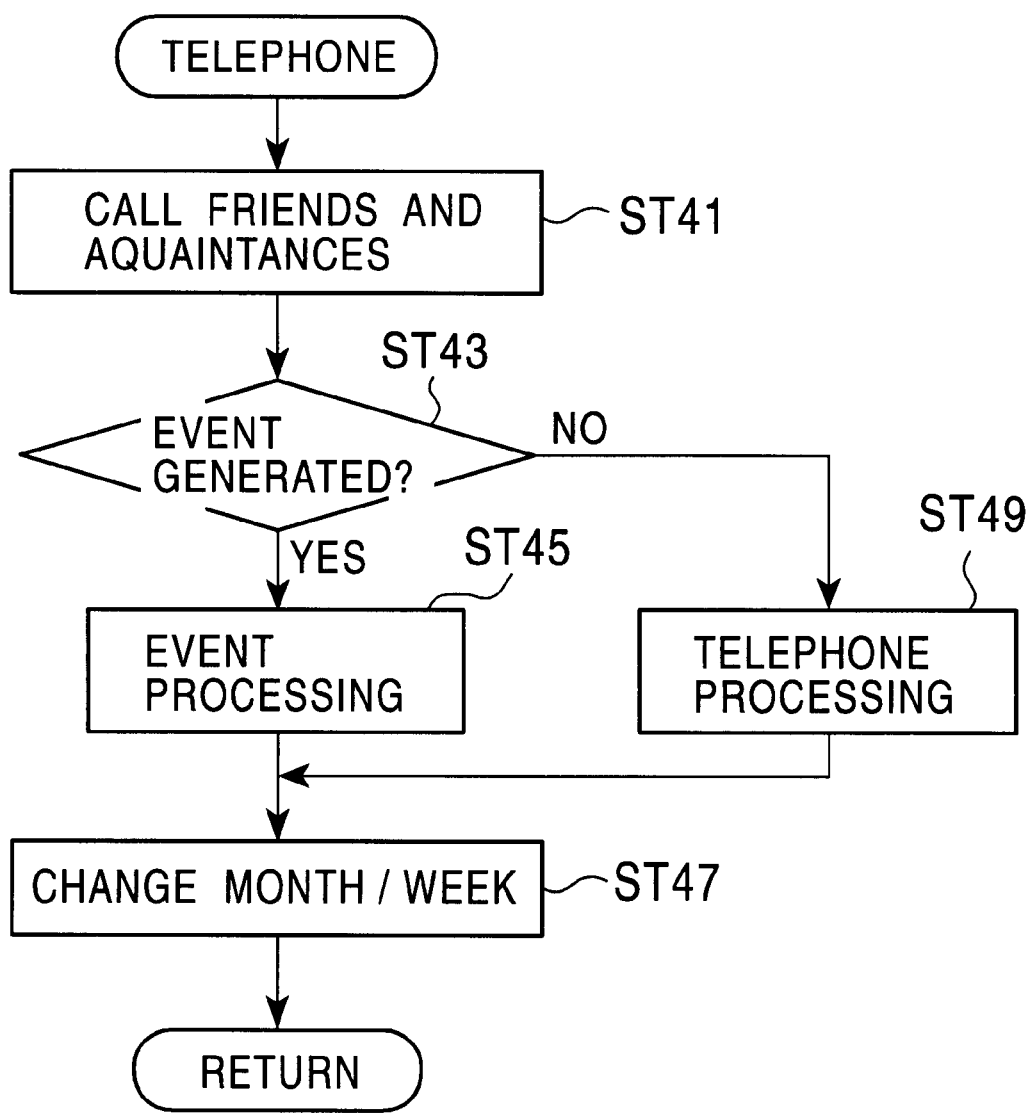
FIG. 20 is a diagram illustrating the sub-routine of the "telephone" menu in step ST4.

FIG. 20 shows a sub-routine of the "telephone" menu in step ST4. In the event that the "telephone" menu is selected from the screen shown in FIG. 3, a screen for making telephone calls to friends and acquaintances (FIG. 12) is displayed (step ST41), and judgement is made partway through regarding whether or not an event has occurred (step ST43). In the event that an event such as automatic joining (FIG. 7) has occurred, the event processing is executed (step ST45), the month/week changing processing is executed (step ST47), and the present flow is completed. Also, in the event that an event has not occurred, a normal telephone processing is executed (step ST49), following which the month and week is changed (step ST47), and the present flow ends.

Figure 21:
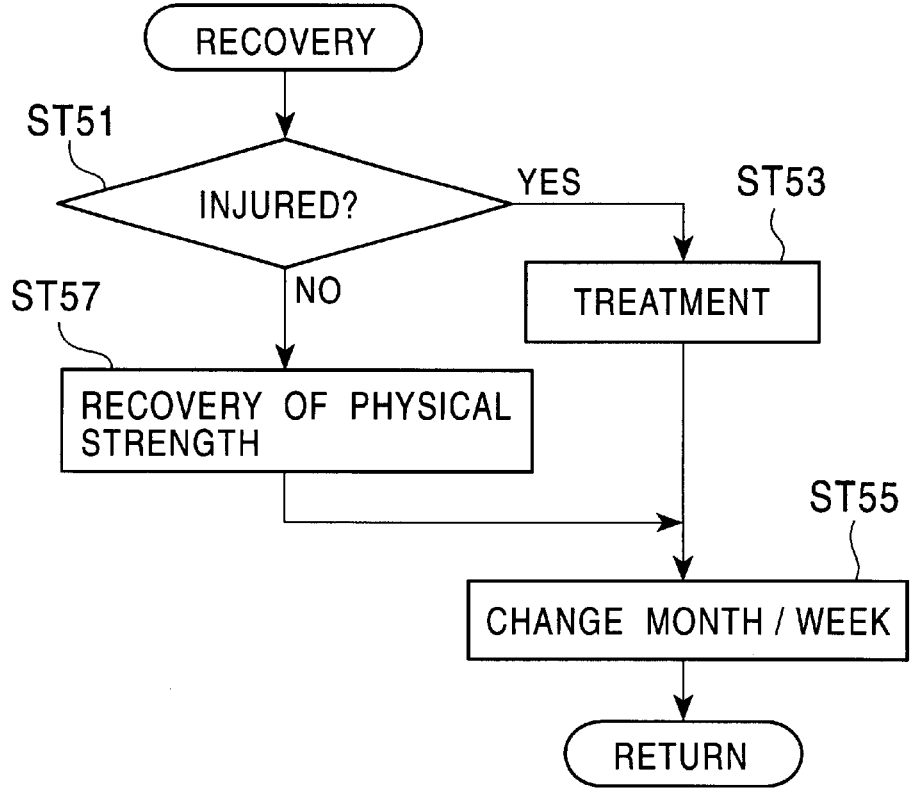
FIG. 21 is a diagram illustrating the sub-routine of the "recovery" menu in step ST4.

FIG. 21 shows a sub-routine of the "recovery" menu in step ST4. In the event that the "recovery" menu is selected from the screen shown in FIG. 3, judgement is made whether or not "injured" (step ST51). In the case of "injured", treatment (FIG. 11) processing is executed (step ST53), following which the month and week is changed (step ST55) and the present flow ends. On the other hand, if "injured" is not the case, calculation processing of scored points for recovery of physical strength is executed by the degree means 114 and the like (step ST57), the month and week is changed (step ST55) and the present flow ends.

Figure 22:
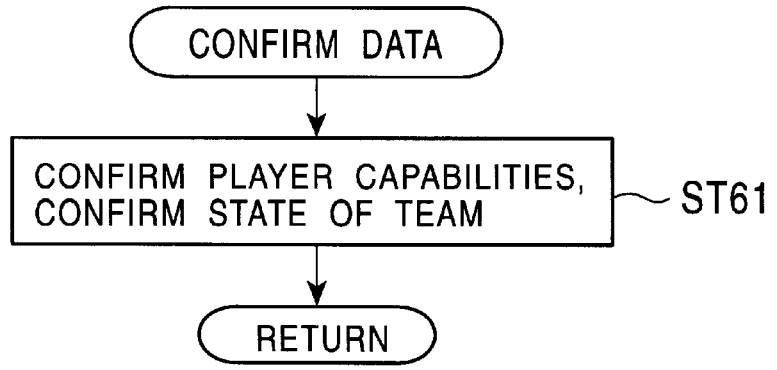
FIG. 22 is a diagram illustrating the sub-routine of the "data confirmation" menu in step ST4.

FIG. 22 shows a sub-routine of the "data confirmation" menu in step ST4. In the event that the "data confirmation" menu is selected from the screen shown in FIG. 3, a member list screen from one side of FIGS. 14 and 15 (e.g., the fielder side) is displayed, operating the operating keys 24 displays the member list screen of the other (e.g., the pitcher side) (step ST61), and in the even of returning to the screen in FIG. 3, "return" is operated. In this case, the month and week are not changed.

Also, the following variations may be made to the present invention.

(1) That is, the present invention has been described with reference to a baseball team, but is not restricted to such; rather, the type of sport is not particularly restricted so long as team competition is possible. Particularly, the characters are not restricted to humans, and may be anime-like animals created as deformations of animals, which would allow various types of games to be developed for all sorts of tastes and likings, and also enable application to games using characters according to the demographic segments such as player and age. Also, there is no need for the main character to be one of the students, and may be head of the baseball team, coach, manager, etc. (in the case also, the main character can be the to belong to the athletic team, in a broad sense). In this case as well, calculation of scored points can be performed in the event that the "practice" menu is processed as a simultaneous practice for all members who have already joined.

(2) Though a certain time period has been provided for obtaining the certain number of team members, but a soliciting game may be made with a different type of limitation, such as making setting where the more talented the student is the hard soliciting is, and further limiting the number of times that soliciting can be made to each, wherein the object of the game is to cause as many talented students as possible to join under these restrictions.

(3) An arrangement may be made wherein even students with low or average capabilities do not automatically join simply by soliciting, but options may be provided regarding the contents of solicitation, such as relatively simple mini-games, or the conversation of solicitation and response, such that procedures for the player to make a selection are provided, thus improving the gaming nature.

(4) The present game may be arranged so as to include in the game cartridge 4 a game of the next stage (such as playing a baseball game for example) following clearing this soliciting game, thereby advancing to the game of the next stage under the condition that this game has been cleared, and further may be arranged so have development to a next game (a baseball game at national competition), under the condition that a baseball game is won.

(5) The programs for the soliciting game may be stored in the built-in ROM in the main game unit, instead of types wherein the programs for the soliciting game are stored in a game cartridge loaded to the main game unit. Various types of storing medium may be applied according to the type of game apparatus.

(6) With the present embodiment, soliciting regarding joining the team is made by conversation between the main character and other characters, but the solicitation method is not restricted to conversation, and arrangements may be made having game processing means as soliciting processing means for both characters to perform a pre-stored simple game (such as scissors-paper-rock, which has a random nature), or game processing means for performing a pre-stored simple competition game, either individually or in a combined manner, with joining the team determined by the results of the games. The arrangement in this case may be a game wherein the soliciting processing means simply uses random numbers or the like to determine the winner purely by probability, or wherein the player operates the main characters side through the operating keys 24 in a manner close to the above-described mini-game. Or, a simple form may be taken wherein display of a handshake screen means success in the solicitation, and failure otherwise.

(7) With the present embodiment, the difference (in difficulty of soliciting) between characters who automatically join and characters who join by a mini-game is the capability level, but the present invention is not restricted to the difference in capability level, so difference may be made according to the attribute contents provided to each other character beforehand for example, or such that the difficulty in solicitation changes randomly for each time the game is played.

As described above, the video game device according to the present invention comprises: an image storing means for storing a main character belonging to a game space prepared beforehand comprised having a plurality of places and to a sport team, and a plurality of other characters provided with different capabilities regarding the sport; a display means for displaying stored contents; an operating member for instructing the displayed main character to move to various places within the game space; a member registering means for capable of registering other characters as team members, only as many as comprise the team; and a soliciting processing means for at least registering other characters with the member registering means, only as many as comprise the team, by means of operating the operating member to move the main character to certain places; may further comprise: a clock means for running forward time defined on the game space, following the progression of the game; and a judging means for judging whether or not a certain number of people or more have been registered as team members within a certain amount of time. According to this arrangement, the game cannot be cleared unless a certain number or more of team members are registered within a certain time, thus enabling the game to be of more absorbing interest.

Also, the clock means may cause only a certain amount of time to pass under the condition that conversation regarding the solicitation has been made with other characters by the soliciting processing means, and according to this arrangement, time passes each time solicitation is made, so the gaming nature of the soliciting game increases.

Further, the soliciting processing means may automatically register the plurality of other characters as team members to the member registering means simply by holding conversations therewith regarding the solicitation, and the soliciting processing means may automatically register the plurality of other characters having normal capabilities as team members to the member registering means simply by holding conversations therewith regarding the solicitation. According to this arrangement, it is not easy to create a strong team, but ease of operation on the part of the player is facilitated in the course of creating the team that the player desires, thereby reducing a certain amount of operating burden on the player.

In the above, the soliciting processing means may have an event processing means occurring randomly, for executing the contents of event causing conversation regarding the solicitation with the plurality of other characters such as brothers, without the main character moving to certain places by instruction from the operating means, or the soliciting processing means may have an event processing means occurring randomly, for executing the contents of event causing conversation regarding the solicitation with the plurality of other characters having normal capabilities, without the main character moving to certain places by instruction from the operating means. According to this arrangement, the rate of member solicitation can be skillfully increased.

Also, the soliciting processing means may have a mini-game execution processing means wherein in the event that the contents of the conversation regarding the solicitation with at least one or more other characters are whether or not to execute a mini-game for obtaining solicitation permission, registration is made to the member registering means as a team member regarding which solicitation has succeeded, under the condition that the results of the mini-game performed using the operating means are that certain conditions have been cleared, or, the soliciting processing means has a mini-game execution processing means wherein in the event that the contents of the conversation regarding the solicitation with at least one or more other certain characters having high capabilities are whether or not to execute a mini-game for obtaining solicitation permission, registration is made to the member registering means as a team member regarding which solicitation has succeeded, under the condition that the results of the mini-game performed using the operating means are that certain conditions have been cleared. According to this arrangement, operating capabilities of the player become necessary in order to cause a certain other character or another character with high capabilities to join, thereby increasing the gaming nature and absorbing interest.

Further, arrangements having clock means may further comprise: a training execution processing means for performing training regarding registered members in order to change the capabilities thereof; and a capabilities changing means (degree means) for changing the capabilities provided to the registered members as a result of the training executed upon receiving instruction from the operating member. According to this arrangement, a game with a higher level can be provided, wherein solicitation processing must be performed within the limited time period, and also the capabilities of the members must be increased.

In the above, the clock means may cause only a certain amount of time to pass under the condition that training has been executed with the training execution processing means, and according to this arrangement, time also passes with training, so the player must take the time distribution for soliciting operations and training instructions into consideration, making for a high-level game.

Also, a competition game executing means and a permitting means (clear judging means) for permitting execution of the competition game in the event that the judging results are affirmed, may be provided. According to this arrangement, at the point that the game has been cleared, i.e., in the event that a team has been created, competition can be conducted using this team, so a game with a strong story nature can be applied.

Also, the above contents can be applied to a control method for processing of soliciting video characters to join simulated team, and a readable recording medium recording a control program for soliciting video characters to join simulated team.

According to first, second, and third aspects of the present invention, the operating member is operated to move the main character to desired places in the game space so as to register other characters with member registering means, so a game can be provided wherein various or suitable teams can be configured by operation of the player.

An arrangement may be used wherein the game cannot be cleared unless a certain number or more of team members are registered within a certain time, so the game can be made to have more absorbing interest. Time may be made to elapse each time a solicitation is made, so the gaming nature as a soliciting game can be increased. Also, ease of the operations of the player for forming a team may be facilitated as appropriate, so a certain amount of operating load can be lightened.

Also, an arrangement wherein the rate of member solicitation can be skillfully increased may be employed, thereby realizing a high gaming nature. Or, operating capabilities of the player may be made necessary in order to cause a certain other character or another character with high capabilities to join, thereby increasing the gaming nature and absorbing interest.

Solicitation operating may be made to be performed within the limited time period, and also the capabilities of the members increased in the same time period, which creates a game with a higher level. Also, time also may be made to pass with training, so the player must take the time distribution for soliciting operations and training instructions into consideration, making for an even more high-level game.

Further, the present invention can be moreover arranged so that competition can be conducted using this team at the point that the game has been cleared, i.e., in the event that a team has been created, so a game with a strong story nature can be provided.

What is claimed is:

1. A video game device, comprising:
   an image storing means for storing a main character belonging to a game space prepared beforehand comprised having a plurality of places and to a sport team, and a plurality of other characters provided with different capabilities regarding said sport;
   a display means for displaying stored contents;
   an operating member for instructing the displayed main character to move to various places within said game space;
   a member registering means for capable of registering other characters as team members, only as many as comprise the team; and
   a soliciting processing means for at least registering other characters with said member registering means, only as many as comprise the team, by means of operating said operating member to move said main character to certain places.

2. A video game device according to claim 1, further comprising:
   a clock means for running forward time defined on the game space, following the progression of the game; and
   a judging means for judging whether or not a certain number of people or more have been registered as team members within a certain amount of time.

3. A video game device according to claim 2, wherein said clock means causes only a certain amount of time to pass under the condition that conversation regarding said solicitation has been made with other characters by said soliciting processing means.

4. A video game device according to claim 1, wherein, regarding said plurality of other characters, said soliciting processing means automatically registers as team members to said member registering means by holding conversations therewith regarding said solicitation.

5. A video game device according to claim 2, wherein, regarding said plurality of other characters, said soliciting processing means automatically registers as team members to said member registering means by holding conversations therewith regarding said solicitation.

6. A video game device according to claim 3, wherein, regarding said plurality of other characters, said soliciting processing means automatically registers as team members to said member registering means by holding conversations therewith regarding said solicitation.

7. A video game device according to claim 1, wherein, regarding said plurality of other characters having normal capabilities, said soliciting processing means registers as team members to said member registering means simply by holding conversations therewith regarding said solicitation.

8. A video game device according to claim 2, wherein, regarding said plurality of other characters having normal capabilities, said soliciting processing means registers as team members to said member registering means simply by holding conversations therewith regarding said solicitation.

9. A video game device according to claim 3, wherein, regarding said plurality of other characters having normal capabilities, said soliciting processing means registers as team members to said member registering means simply by holding conversations therewith regarding said solicitation.

10. A video game device according to claim 4, wherein said soliciting processing means has an event processing means occurring randomly, for executing the contents of event causing conversation regarding said solicitation with said plurality of other characters, without the main character moving to certain places by instruction from said operating means.

11. A video game device according to claim 7, wherein said soliciting processing means has an event processing means occurring randomly, for executing the contents of event causing conversation regarding said solicitation with said plurality of other characters having normal capabilities, without the main character moving to certain places by instruction from said operating means.

12. A video game device according to claim 1, wherein said soliciting processing means has a mini-game execution processing means, and in the event that the contents of the conversation regarding said solicitation with at least one or more other certain characters are whether or not to execute a mini-game for obtaining solicitation permission, registration is made to said member registering means as a team member regarding which solicitation has succeeded, under the condition that the results of the mini-game performed using said operating means are that certain conditions have been cleared.

13. A video game device according to claim 2, wherein said soliciting processing means has a mini-game execution processing means, and in the event that the contents of the conversation regarding said solicitation with at least one or more other certain characters are whether or not to execute a mini-game for obtaining solicitation permission, registration is made to said member registering means as a team member regarding which solicitation has succeeded, under the condition that the results of the mini-game performed using said operating means are that certain conditions have been cleared.

14. A video game device according to claim 3, wherein said soliciting processing means has a mini-game execution processing means, and in the event that the contents of the conversation regarding said solicitation with at least one or more other certain characters are whether or not to execute a mini-game for obtaining solicitation permission, registration is made to said member registering means as a team member regarding which solicitation has succeeded, under the condition that the results of the mini-game performed using said operating means are that certain conditions have been cleared.

15. A video game device according to claim 4, wherein said soliciting processing means has a mini-game execution processing means, and in the event that the contents of the conversation regarding said solicitation with at least one or more other certain characters are whether or not to execute a mini-game for obtaining solicitation permission, registration is made to said member registering means as a team member regarding which solicitation has succeeded, under the condition that the results of the mini-game performed using said operating means are that certain conditions have been cleared.

16. A video game device according to claim 7, wherein said soliciting processing means has a mini-game execution processing means, and in the event that the contents of the conversation regarding said solicitation with at least one or more other certain characters are whether or not to execute a mini-game for obtaining solicitation permission, registration is made to said member registering means as a team member regarding which solicitation has succeeded, under the condition that the results of the mini-game performed using said operating means are that certain conditions have been cleared.

17. A video game device according to claim 10, wherein said soliciting processing means has a mini-game execution processing means, and in the event that the contents of the conversation regarding said solicitation with at least one or more other certain characters are whether or not to execute a mini-game for obtaining solicitation permission, registration is made to said member registering means as a team member regarding which solicitation has succeeded, under the condition that the results of the mini-game performed using said operating means are that certain conditions have been cleared.

18. A video game device according to claim 11, wherein said soliciting processing means has a mini-game execution processing means, and in the event that the contents of the conversation regarding said solicitation with at least one or more other certain characters are whether or not to execute a mini-game for obtaining solicitation permission, registration is made to said member registering means as a team member regarding which solicitation has succeeded, under the condition that the results of the mini-game performed using said operating means are that certain conditions have been cleared.

19. A video game device according to claim 1, wherein said soliciting processing means has a mini-game execution processing means, and in the event that the contents of the conversation regarding said solicitation with at least one or more other certain characters having high capabilities are whether or not to execute a mini-game for obtaining solicitation permission, registration is made to said member registering means as a team member regarding which solicitation has succeeded, under the condition that the results of the mini-game performed using said operating means are that certain conditions have been cleared.

20. A video game device according to claim 2, wherein said soliciting processing means has a mini-game execution processing means, and in the event that the contents of the conversation regarding said solicitation with at least one or more other certain characters having high capabilities are whether or not to execute a mini-game for obtaining solicitation permission, registration is made to said member registering means as a team member regarding which solicitation has succeeded, under the condition that the results of the mini-game performed using said operating means are that certain conditions have been cleared.

21. A video game device according to claim 3, wherein said soliciting processing means has a mini-game execution processing means, and in the event that the contents of the conversation regarding said solicitation with at least one or more other certain characters having high capabilities are whether or not to execute a mini-game for obtaining solicitation permission, registration is made to said member registering means as a team member regarding which solicitation has succeeded, under the condition that the results of the mini-game performed using said operating means are that certain conditions have been cleared.

22. A video game device according to claim 4, wherein said soliciting processing means has a mini-game execution processing means, and in the event that the contents of the conversation regarding said solicitation with at least one or more other certain characters having high capabilities are whether or not to execute a mini-game for obtaining solicitation permission, registration is made to said member registering means as a team member regarding which solicitation has succeeded, under the condition that the results of the mini-game performed using said operating means are that certain conditions have been cleared.

23. A video game device according to claim 7, wherein said soliciting processing means has a mini-game execution processing means, and in the event that the contents of the conversation regarding said solicitation with at least one or more other certain characters having high capabilities are whether or not to execute a mini-game for obtaining solicitation permission, registration is made to said member registering means as a team member regarding which solicitation has succeeded, under the condition that the results of the mini-game performed using said operating means are that certain conditions have been cleared.

24. A video game device according to claim 10, wherein said soliciting processing means has a mini-game execution processing means, and in the event that the contents of the conversation regarding said solicitation with at least one or more other certain characters having high capabilities are whether or not to execute a mini-game for obtaining solicitation permission, registration is made to said member registering means as a team member regarding which solicitation has succeeded, under the condition that the results of the mini-game performed using said operating means are that certain conditions have been cleared.

25. A video game device according to claim 11, wherein said soliciting processing means has a mini-game execution processing means, and in the event that the contents of the conversation regarding said solicitation with at least one or more other certain characters having high capabilities are whether or not to execute a mini-game for obtaining solicitation permission, registration is made to said member registering means as a team member regarding which solicitation has succeeded, under the condition that the results of the mini-game performed using said operating means are that certain conditions have been cleared.

26. A video game device according to claim 2, further comprising:

a training execution processing means for performing training regarding registered members in order to change the capabilities thereof; and a capabilities changing means for changing the capabilities provided to the registered members as a result of the training executed upon receiving instruction from said operating member.

27. A video game device according to claim 26, wherein said clock means causes only a certain amount of time to pass under the condition that training has been executed with said training execution processing means.

28. A video game device according to claim 2, further comprising:

a competition game executing means; and a permitting means for permitting execution of said competition game in the event that said judging results are affirmed.

29. A video game device according to claim 26, further comprising:

a competition game executing means; and a permitting means for permitting execution of said competition game in the event that said judging results are affirmed.

30. A video game device according to claim 27, further comprising:

a competition game executing means; and a permitting means for permitting execution of said competition game in the event that said judging results are affirmed.

31. A control method for processing of soliciting video characters to join simulated team, for storing beforehand in a manner displayable on display means a main character belonging to a game space prepared beforehand comprised having a plurality of places and to a sport team, and a plurality of other characters provided with different capabilities regarding said sport, for operating an operating member to instruct said main character to move to certain places within said game space, and for registering to the registering unit other characters as team members, at least only as many as comprise the team, at the location to which moving was performed.

32. A readable recording medium recording a control program for soliciting video characters to join simulated team, wherein a main character belonging to a game space prepared beforehand comprised having a plurality of places and to a sport team, and a plurality of other characters provided with different capabilities regarding said sport, are stored beforehand in a manner displayable on display means, an operating member is operated to instruct said main character to move to certain places within said game space, and other characters are registered to the registering means as team members, at least only as many as comprise the team, at the location to which moving was performed.

* * * * *